United States Patent
Vouitsis et al.

(10) Patent No.: US 12,547,634 B1
(45) Date of Patent: Feb. 10, 2026

(54) COMPUTING SYSTEMS AND METHODS FOR GENERATING A RESPONSE TO A QUERY BASED ON A CORPUS OF DOCUMENTS

(71) Applicant: The Toronto-Dominion Bank, Toronto (CA)

(72) Inventors: Noël Vouitsis, Markham (CA); Jiapeng Wu, Toronto (CA); Yi Sui, Newmarket (CA); Graham Andrew Warner, Victoria (CA); Paulina Corona Ugalde, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/813,950

(22) Filed: Aug. 23, 2024

(51) Int. Cl.
   *G06F 16/2457* (2019.01)
(52) U.S. Cl.
   CPC .............................. *G06F 16/24578* (2019.01)
(58) Field of Classification Search
   CPC .................................................. G06F 16/24578
   See application file for complete search history.

(56) References Cited

U.S. PATENT DOCUMENTS

| | | |
|---|---|---|
| 8,346,792 B1 | 1/2013 | Baker |
| 12,079,570 B1 | 9/2024 | Mondlock |
| 12,164,542 B1 | 12/2024 | Rahman |
| 12,242,468 B1* | 3/2025 | Brenner ............ G06F 16/24578 |
| 12,298,949 B2 | 5/2025 | Arora |
| 2024/0386015 A1* | 11/2024 | Crabtree ............. G06F 16/9024 |
| 2024/0403343 A1 | 12/2024 | Ramanasankaran |
| 2024/0411994 A1* | 12/2024 | Siracusano ........... G06F 40/205 |
| 2024/0412720 A1 | 12/2024 | Vasylyev |
| 2025/0028852 A1 | 1/2025 | Chowanski |
| 2025/0030547 A1 | 1/2025 | Chowanski |
| 2025/0061140 A1* | 2/2025 | Levinson ................ G06F 40/30 |
| 2025/0068646 A1 | 2/2025 | Rahman |
| 2025/0077939 A1 | 3/2025 | Tabatabaei |
| 2025/0094480 A1* | 3/2025 | Shi ........................ G06F 40/289 |
| 2025/0104700 A1 | 3/2025 | Henault-Ethier |
| 2025/0138838 A1 | 5/2025 | Ramesh |
| 2025/0139267 A1 | 5/2025 | Zykh |

(Continued)

OTHER PUBLICATIONS

U.S. Appl. No. 63/538,747, filed Sep. 15, 2023. (Year: 2023).*

(Continued)

*Primary Examiner* — Jay A Morrison
(74) *Attorney, Agent, or Firm* — Marks & Clerk; Paul Horbal; Jennifer Davy

(57) ABSTRACT

Systems and methods for retrieving information from a corpus of documents that is relevant to a query. The method comprising: subdividing each document in the corpus of documents into one or more chunks; using a synthetic generation LLM to generate at least one piece of synthetic information related to each chunk; generating, using an embedding model a plurality of vectors for each chunk, the plurality of vectors for a chunk comprising a vector generated from the chunk, and a vector generated from each of the at least one piece of synthetic information related to that chunk; and using an information retrieval system to identify, from the plurality of vectors for each chunk, a set of chunks that are relevant to a query.

19 Claims, 17 Drawing Sheets

(56) References Cited

U.S. PATENT DOCUMENTS

| | | |
|---|---|---|
| 2025/0173170 A1 | 5/2025 | Glynn-Udrow |
| 2025/0238410 A1 | 7/2025 | Arora |
| 2025/0245071 A1 | 7/2025 | Ionescu |
| 2025/0284755 A1 | 9/2025 | Lee |

OTHER PUBLICATIONS

Björk, Hugo, and Axel Andersson. "Strategies for Accurate Context Retrieval in Retrieval—Augmented Generation Systems Across Diverse Datasets." Masters Thesis, Linköping University, Department of Computer and Information Science. Available from: Jul. 10, 2024. (Year: 2024).*

Office Action (Non-Final Rejection) mailed Apr. 15, 2025 in U.S. Appl. No. 18/814,018 (41 pages).

Trivedi, Harsh, et al. "Interleaving retrieval with chain-of-thought reasoning for knowledge-intensive multi-step questions." arXiv preprint arXiv:2212.10509 (2022). (Year: 2022).

Office Action (Non-Final Rejection) mailed Jun. 18, 2025 in U.S. Appl. No. 18/813,704 (10 pages).

Office Action (Final Rejection) and mailed Jul. 30, 2025 in U.S. Appl. No. 18/814,018 (46 pages).

Mollard et al., Improving retrieval augmented generation, Lab. Phys. Sci.(LPS), Univ. Maryland, College Park, MD, USA, Tech. Rep. Aug. 9, 2024. (Year: 2024).

\* cited by examiner

COMPUTING SYSTEMS AND METHODS FOR GENERATING A RESPONSE TO A QUERY BASED ON A CORPUS OF DOCUMENTS

TECHNICAL FIELD

The disclosed example embodiments relate to computer-implemented methods and systems for generating a response to a query based on a corpus of documents, and more specifically for generating a response to a query from a corpus of documents using a large language model (LLM)-based retrieval-augmented generation (RAG) system.

BACKGROUND

There are many applications where it may be useful to be able to generate a response to a query based on a private or non-public corpus of documents (e.g., documents internal to an enterprise). For example, an enterprise may have a set of agents that receive enquiries from customers about products and services offered by the enterprise. While information that the resolves the customer's query can generally be found in the enterprise's internal and/or external documents it may be cumbersome for an agent (or another enterprise employee) to locate information relevant to a customer's query in the internal and/or external documents. It is desirable to generate an answer to the customer's query in a more efficient and automated way.

With the emergence of large language models (LLMs) and their ability to generate understand and generate human-like text based on patterns they recognize, LLMs seem well suited to automatically generate responses to queries. However, while LLMs are trained on a vast amount of data from various fields, if the query relates to information that is not known to the LLM (e.g., information that did not form part of the LLM's training dataset)—because, for example, the information relates to a specific domain or to an enterprise's internal knowledge base—the LLM may not be able to provide an accurate answer to the query. Accordingly, a technique referred to as retrieval augmented generation (RAG) has been developed. In RAG, a query is first sent to an information retrieval (IR) system to retrieve information from an external knowledge base (external to the data used to train the LLM) which comprises, for example, documents etc. related to a specific domain and/or an enterprise's internal documents etc.; then the retrieved information and the original query are provided to an LLM along with instructions to generate a response to the query based on the provided information. In this way the external knowledge base is used to enhance the LLM's output without having to re-train the LLM.

SUMMARY

The following summary is intended to introduce the reader to various aspects of the detailed description, but not to define or delimit any invention.

A first aspect provides a system for retrieving information from a corpus of documents relevant to a query, the system comprising: a memory, a communication interface, and at least one processor operatively coupled to the memory and the communication interface; the at least one processor configured to: subdivide each document in the corpus of documents into one or more chunks; use a synthetic generation LLM to generate at least one piece of synthetic information related to each chunk; generate, using an embedding model a plurality of vectors for each chunk, the plurality of vectors for a chunk comprising a vector generated from the chunk, and a vector generated from each of the at least one piece of synthetic information related to that chunk; and use an information retrieval system to identify, from the plurality of vectors for each chunk, a set of chunks that are relevant to a query.

The at least one processor may be configured to use the synthetic generator to generate the at least one piece of synthetic information for each chunk by, for each chunk, providing the chunk to the synthetic generation LLM along with a prompt that instructs the synthetic generator to generate the at least one piece of synthetic information for the chunk.

At least one piece of synthetic information for the chunk may comprise one or more of a summary of the chunk, one or more keywords for the chunk, a content of the chunk, and one or more questions that can be answers by a content of the chunk.

Th at least one processor may be configured to use the synthetic generator to generate the at least one piece of synthetic information for each chunk, by, for each document of the corpus of document, providing the document to the synthetic generation LLM along with a prompt that instructs the synthetic generation LLM to generate synthetic information for the chunk, and wherein the synthetic information for the document is used as a piece of synthetic information for each chunk generated from that document.

The synthetic information for the document may be a summary of the document.

The plurality of vectors for each chunk may be stored in a search index of the information retrieval system.

The information retrieval system may be configured to identify, from the plurality of vectors for each chunk, the set of chunks that are relevant to the query by generating, using the embedding model, a vector for the query; comparing the vector for the query to the plurality of vectors for each chunk; and identifying the set of chunks that are relevant to the query based on the comparisons.

The information retrieval system may be configured to identify, from the plurality of vector for each chunk, the set of chunks that are relevant to the query by: generating, using the embedding model, a vector for the query; performing a first vector search on the vectors generated from each chunk to identify a first set of k ranked chunks with vectors that are closest to vector for the query; and performing a second vector search on the vectors generated from a same type of synthetic information for each to identify a second set of k ranked chunks with vectors that are closest to the vector for the query; and identifying a set of k chunks that are most similar to the query from the first set of k ranked chunks and the second set of k ranked chunks.

The set of k chunks that are most similar to the query may be identified from the first set of k ranked chunks and the second set of k ranked chunks using a reciprocal rank fusion algorithm.

The at least one processor may be further configured to retrieve the set of chunks that are relevant to the query from storage.

The at least one processor may be further configured to use a re-ranker LLM to rank the set of chunks relevant to the query based on a relevance to the query or another query related to the query.

The at least one processor may be further configured to select a subset of chunks from the set of chunks relevant to the query or the other query based on the ranking.

Selecting the subset of chunks from the set of chunks relevant to the query based on the ranking may comprise selecting k chunks of the set of chunks relevant to the query with a highest ranking to form the subset, wherein k is an integer greater than or equal to 1.

Selecting the subset of chunks from the set of chunks of the first size based on the ranking may comprise selecting a set of top documents of the corpus of documents from the ranking and selecting all or a portion of the chunks in the set of chunks relevant to the query associated with the set of top documents to form the subset.

The at least one processor may be further configured to use a generation LLM to generate a response to the query or the other query based on the subset of chunks.

The response to the query or the other query may comprise one or more citations to a document of the corpus of documents corresponding to a chunk of the subset of chunks. The at least one processor may be further configured to: use a query modification LLM to generate synthetic information related to a second query; and generate an amended second query based on the synthetic information related to the second query; and wherein the query is the amended second query.

The at least one processor may be configured to: use the query modification LLM to generate synthetic information related to the second query by instructing the query modification LLM to generate a set of one or more keywords for the second query; and generate the amended second query based on the synthetic information related to the second query by combining the second query and the set of one or more keywords to form the amended second query.

A second aspect provides a method for retrieving information from a corpus of documents relevant to a query, the method executed in a computing environment comprising one or more processors, a communication interface, and memory, and the method comprising: subdividing each document in the corpus of documents into one or more chunks; using a synthetic generation LLM to generate at least one piece of synthetic information related to each chunk; generating, using an embedding model a plurality of vectors for each chunk, the plurality of vectors for a chunk comprising a vector generated from the chunk, and a vector generated from each of the at least one piece of synthetic information related to that chunk; and using an information retrieval system to identify, from the plurality of vectors for each chunk, a set of chunks that are relevant to a query.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

As described above, a technique referred to as retrieval augmented generation (RAG) has been developed to allow LLMs to generate accurate responses to queries that related to subject matter that does not form part of the LLM's training dataset. In RAG, a query is first sent to an IR system to retrieve information from an external knowledge base (external to the data used to train the LLM) which comprises, for example, documents etc. related to a specific domain and/or an enterprise's internal documents etc.; then the retrieved information and the original query are provided to an LLM along with instructions to generate a response to the query based on the provided information. In this way the external knowledge is used to enhance the LLM's output without having to re-train the LLM.

Described herein are enhanced LLM-based RAG systems and methods for automatically generating a response to a query from a corpus of documents. Specifically, in the methods and systems described herein, an LLM is used to generate synthetic information related to the query; an amended query is generated from the synthetic information; an information retrieval system is used to retrieve, from a plurality of chunks (each of which is all or a portion of a document in the corpus of documents), a set of chunks that are relevant to the amended query; an LLM is used to rank the set of chunks based on their relevance to the query; a subset of the set of chunks is selected based on the ranking; and an LLM is used to generate a response to the query based on the subset of chunks. The systems and methods described herein leverage LLMs to provide an improved RAG system.

Figure 1:
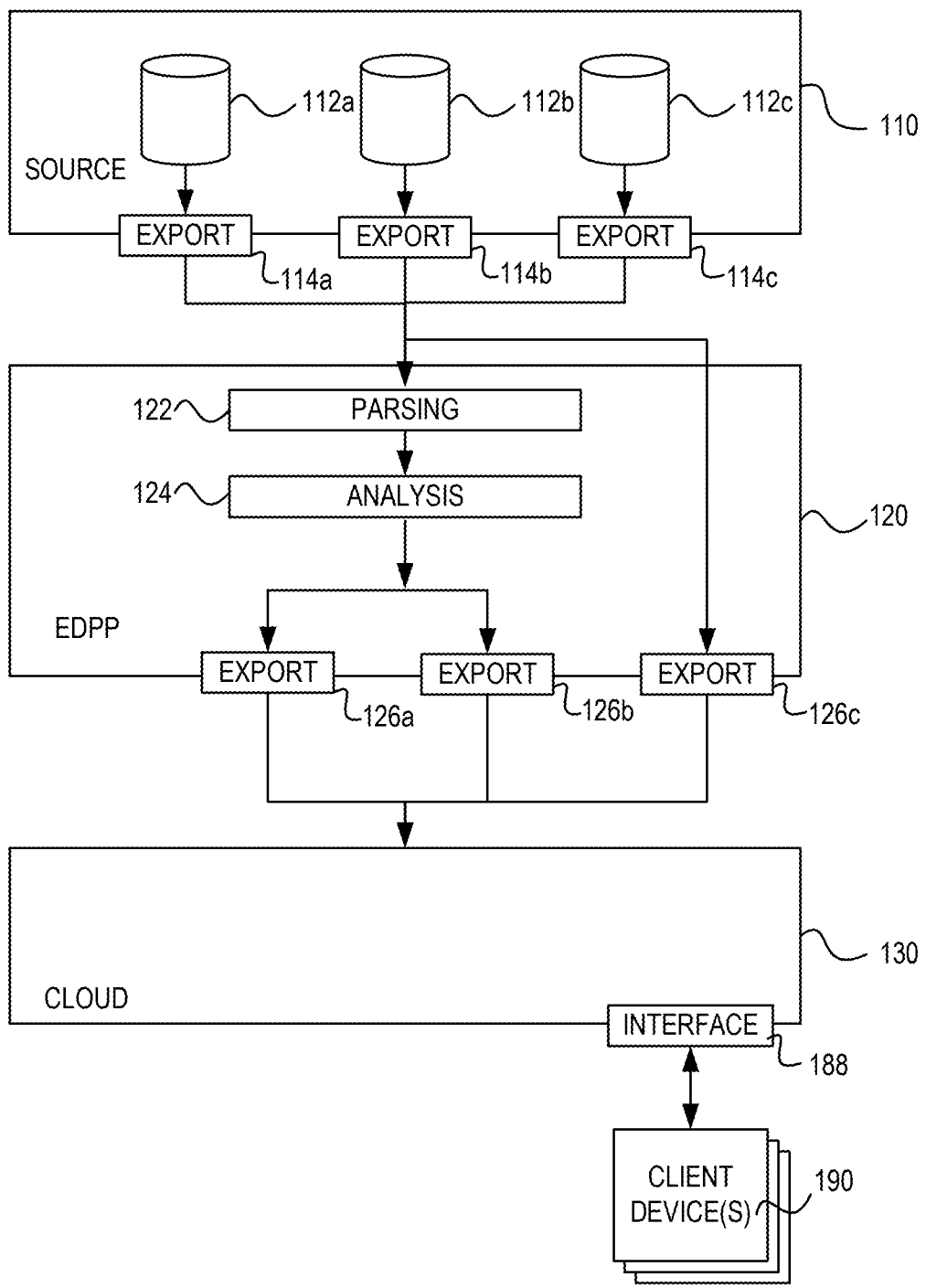
FIG. 1 is a block diagram of an example LLM-based RAG system for generating a response to a query.

Reference is now made to FIG. 1, which illustrates a block diagram of an example computing system 100, in accordance with at least some embodiments. Computing system 100 comprises a source database system 110, an enterprise data provisioning platform (EDPP) 120 operatively coupled to the source database system 110, and a cloud-based computing cluster 130 that is operatively coupled to the EDPP 120. In some cases, this computing system 100 is provided for automatically generating a response to a user query from information in a corpus of documents. In some cases, the documents in the corpus of documents are files that include text. In some cases, different data formats of documents or files (or both), and which include text, can be used in the computing system described herein.

Source database system 110 has one or more databases, of which three are shown for illustrative purposes: database 112a, database 112b and database 112c. One or more of the databases of the source database system 110 may contain confidential information that is subject to restrictions on export. One or more export modules 114a, 114b, 114c may periodically (e.g., daily, weekly, monthly, etc.) export data from the databases 112a, 112b, 112c to EDPP 120. In some instances, the data is exported on an ad hoc basis.

EDPP 120 receives source data exported by the export modules 114a, 114b, 114c of source database system 110, processes it and exports the processed data to an application database within the cloud-based computing cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to a document or group of documents (e.g., a client document) may be exported via reporting and analysis module 124 or an export module 126a, 126b, 126c.

In particular, parsed data can then be processed and transmitted to the cloud-based computing cluster 130 by a reporting and analysis module 124. Alternatively, one or more export modules 126a, 126b, 126c can export the parsed data to the cloud-based computing cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of personal identifiable information (PII) in the confidential data. Moreover, such "on-premises" systems typically are designed with access controls to limit access to the data, and thus may not be resourced or otherwise suitable for use in broader dissemination of the data. In some cases, to comply with such restrictions, one or more module of EDPP 120 may "de-risk" data tables that contain confidential data prior to transmission to cloud-based computing cluster 130. In some cases, this de-risking process may obfuscate or mask elements of confidential data, or may exclude certain elements, depending on the specific restrictions applicable to the confidential data. The specific type of obfuscation, masking or other processing is referred to as a "data treatment."

The cloud-based computing cluster 130 includes an interface 188, which facilitates data communication with one or more of the client devices 190.

In some environments, the EDPP may be omitted.

Figure 2:
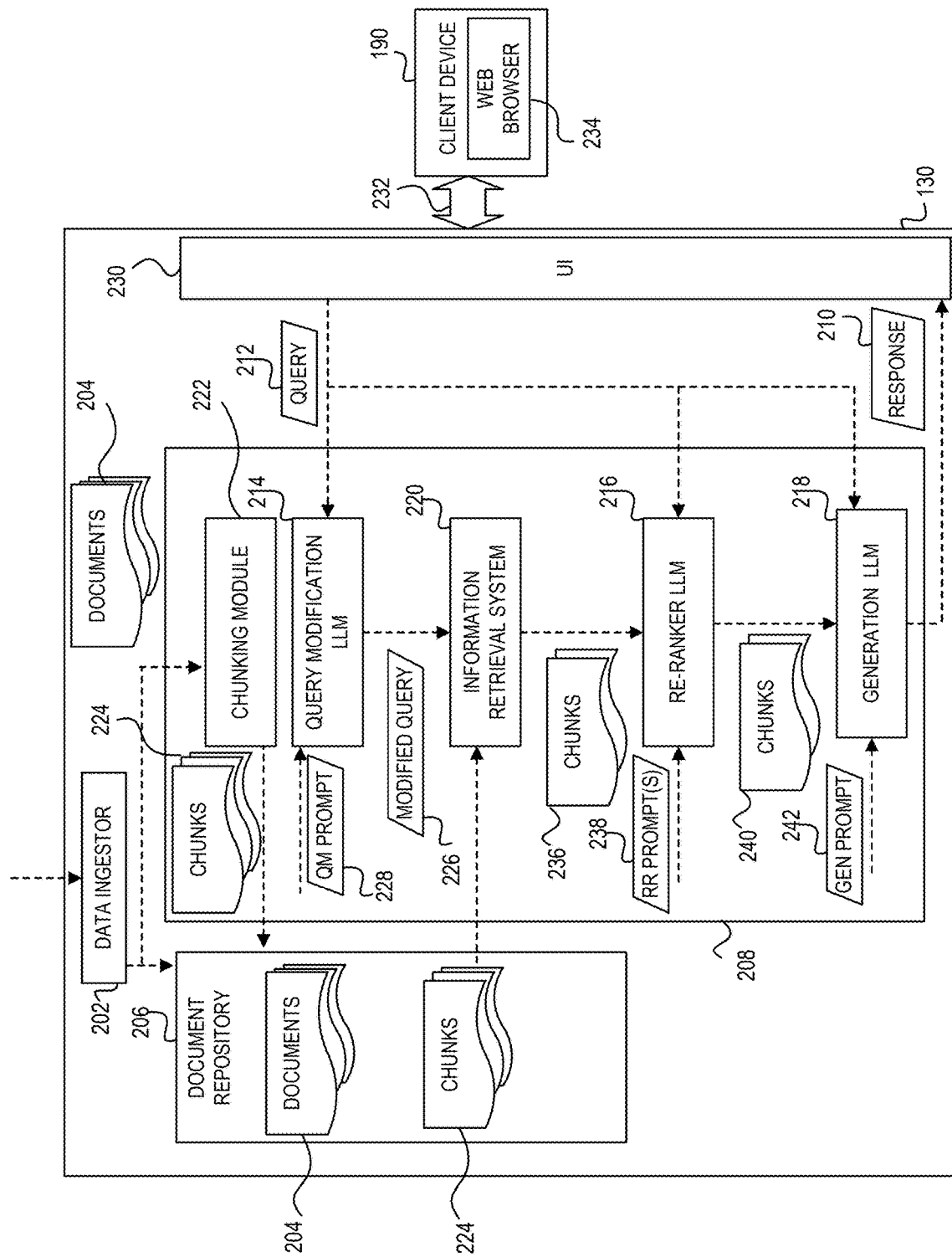
FIG. 2 is a block diagram of an example implementation of the cloud-based computing cluster of FIG. 1 configured to generate a response to a query.

Reference is now made to FIG. 2, which illustrates an example implementation of the cloud-based computing cluster 130 of FIG. 1. In the example shown in FIG. 2 the cloud-based computing cluster 130 comprises a data ingestor 202 for receiving a set of documents 204, a document repository 206 for storing the received set of documents 204, and a pipeline 208 for automatically generating a response 210 to a user query 212 based on the set of documents 204 using one or more LLMs 214, 216, 218 and an IR system 220. Specifically, the pipeline 208 is configured to receive a user query 212; generate, using an LLM 214, a modified user query based on synthetic data generated from the original user query; use the IR system 220 to obtain a set of document chunks relevant to the modified user query; use an LLM 216 to re-rank the set of documents chunks based on their relevance to the original user query using and select a subset of the set of document chunks based on the ranking; and use an LLM 218 to generate a response to the original user query based on the subset of document chunks. In some cases, one or more components of the cloud-based computing cluster 130 may be implemented by one or more computers within the cloud-based computing cluster. In some cases, one or more components of the cloud-based computing cluster 130 may be implemented as virtual machines within the cloud-based computing cluster.

The data ingestor 202 is configured to receive from, for example, the EDPP 120, a set of documents 204 and store the received set of documents in the document repository 206. The set of documents 204 comprises a corpus of documents that comprise information from which answers to user queries can be found. In some cases, the set of documents 204 may represent a set of web pages. The web pages may include an enterprise's internal web pages and/or external web pages. In such cases, there may be a document (or file) per web page. Where the documents represent web pages the documents may be in HTML (Hyper Text Markup Language) format, or they may be in a different format, such as a markdown format. In some case, the documents may be received at the data ingestor 202 in an original format (e.g., HTML format) and converted, by a format converter (not shown) to another format, such as a markdown format. Converting a document in HTML format to a markdown format removes HTML-related characteristics that are not relevant to human understanding which may help the LLMs 216, 218 from misinterpreting the HTML code. Thus, markdown is a simpler format, vs HTML, that may help improve an LLM's understanding of the document. Where the received documents are converted to another format at the cloud-based computing cluster 130, the set of documents may be stored in the document repository 206 only the converted format or both the original format (e.g., HTML) and the converted format.

The document repository 206 is a storage device or set of storage devices that can be used to store digital or electronic data, including digital or electronic documents. The document repository 206 is designed to store the received set of documents but may also be used to store other electronic information or data.

The pipeline 208 is configured to receive a user query 212 and automatically generate a response 210 thereto based on the content of the set of documents 204. The pipeline 208 comprises a chunking module 222, a query modification LLM 214, an information retrieval (IR) system 220, a re-ranker LLM 216 and a generation LLM 218. In the example of FIG. 2 the query modification LLM 214, the re-ranker LLM 216 and the generation LLM 218 are shown as different LLMs, however, in other examples, two or more of the LLMs 214, 216, 218 may be combined. In other words, in other examples, a single LLM may perform the functions described as being performed by two or more of the query modification LLM 214, the re-ranker LLM 216 and the generation LLM 218. For example, a single LLM may perform the re-ranker LLM 216 and the generation LLM 218 functions.

The chunking module 222 is configured to subdivide or partition each document in the set of documents 204 into one or more portions or chunks 224. Each portion or chunk 224 comprises all or a subset of a document in the set of documents 204. The process of subdividing a document into smaller portions or chunks may be referred to as chunking. The chunks 224 for the set of documents 204 may be stored in the document repository 206. Since one or more of the documents may be large, chunking the set of documents 204 may help the pipeline 208 extract relevant content and therefore improve both the retrieval performed by the information retrieval system 220 and the response generation performed by the generation LLM 218, making them more precise and relevant.

In some cases, the chunking module 222 may segment the text in a given document into portions or chunks of text. In some cases, semantic chunking is used to segment the text. In other cases, document-based chunking is used to segment the text, which identifies and uses a structure of a document—e.g., headers, paragraphs or spaces. Other examples of chunking computations include recursive chunking and fixed-sized chunking. For example, the chunks may be selected so not to exceed a certain size so as to fit within the context window of the re-ranker LLM 216 and/or the generation LLM 218. In other examples, combinations of these chunking methods may be used. Other currently known and future known chunking computations can be used by the chunking module 222. The chunking module 222 may be configured to receive the set of documents 204 from the data ingestor 202 or the chunking module 222 may be configured to retrieve the set of documents 204 from the document repository 206.

The query modification LLM 214 is used to perform query expansion on a user query 212 to generate a modified query 226. Query expansion is a technique in which a query is changed or modified to include additional information to improve the quality of the query. Query expansion can overcome issues with the original query such as, but not limited to, missing keywords, ambiguity or specificity. By incorporating terms and concepts that did not exist in the original query, query expansion can more clearly capture the meaning and context of the user's request which can result in more relevant documents being retrieved by the information retrieval system 220.

Specifically, the query modification LLM 214 receives the user query 212 and a query modification (QM) prompt 228 which instructs the query modification LLM 214 to generate synthetic information related to the user query 212. A modified query 226 is then generated from the synthetic information. The query modification prompt 228 may be configured to instruct the query modification LLM 214 to generate any suitable synthetic information related to the query 212. For example, in some cases, the query modification prompt 228 may be configured to instruct the query modification LLM 214 to generate a set of keywords for the query 212. An example of such a prompt is shown below.

Provide a set of keywords for the following query:
{query}

In other cases, the query modification prompt 228 may be configured to instruct the query modification LLM 214 to: generate a passage that answers the user query 212, wherein the synthetic information is the passage; provide a concise rationale to the user query 212 and think step by step, wherein the synthetic information is the rationale; or generate an answer to the user query 212 and give the rational wherein the rationale is the synthetic information.

In yet other cases, the query modification LLM 214 may be provided with additional information that aids in generating the synthetic information. For example, in some cases, prior to providing the query modification prompt 228 and the query 212 to the query modification LLM 214, the query 212 may be provided to the information retrieval system 220 to retrieve the document closest to the query 212. Then, the query 212, the retrieved document, and a query modification prompt 228 is provided to the query modification LLM 214, wherein the query modification prompt 228 instructs the query modification LLM 214 to generate the synthetic information (e.g., keywords, passage, rationale) given the context of the returned document. It will be evident that these are examples only and that the query modification prompt 228 may be configured to instruct the query modification LLM 214 to generate any suitable synthetic information related to the original user query 212. The inventors have determined that generating a set of keywords words well in many cases.

In some cases, the modified user query 226 is generated from the generated synthetic information by combining the original user query 212 and the synthetic information generated by the query modification LLM 214. For example, the original user query 212 and the synthetic information generated by the query modification LLM 214 (e.g., the keywords, passage or rationale generated by the query modification LLM 214) may be concatenated. In other cases, the modified user query is generated by replacing the original user query 212 with the synthetic information. In other words, in these cases, only the synthetic information forms part of the modified user query 226.

In some cases, the query modification prompt 228 causes the query modification LLM 214 to generate the modified query from the generated synthetic information. However, in other examples, another module, such as a modified query generation module (not shown) may be configured to receive the original user query 212 and the synthetic information generated by the query modification LLM 214 and generate the modified user query 226 therefrom.

Figure 3:
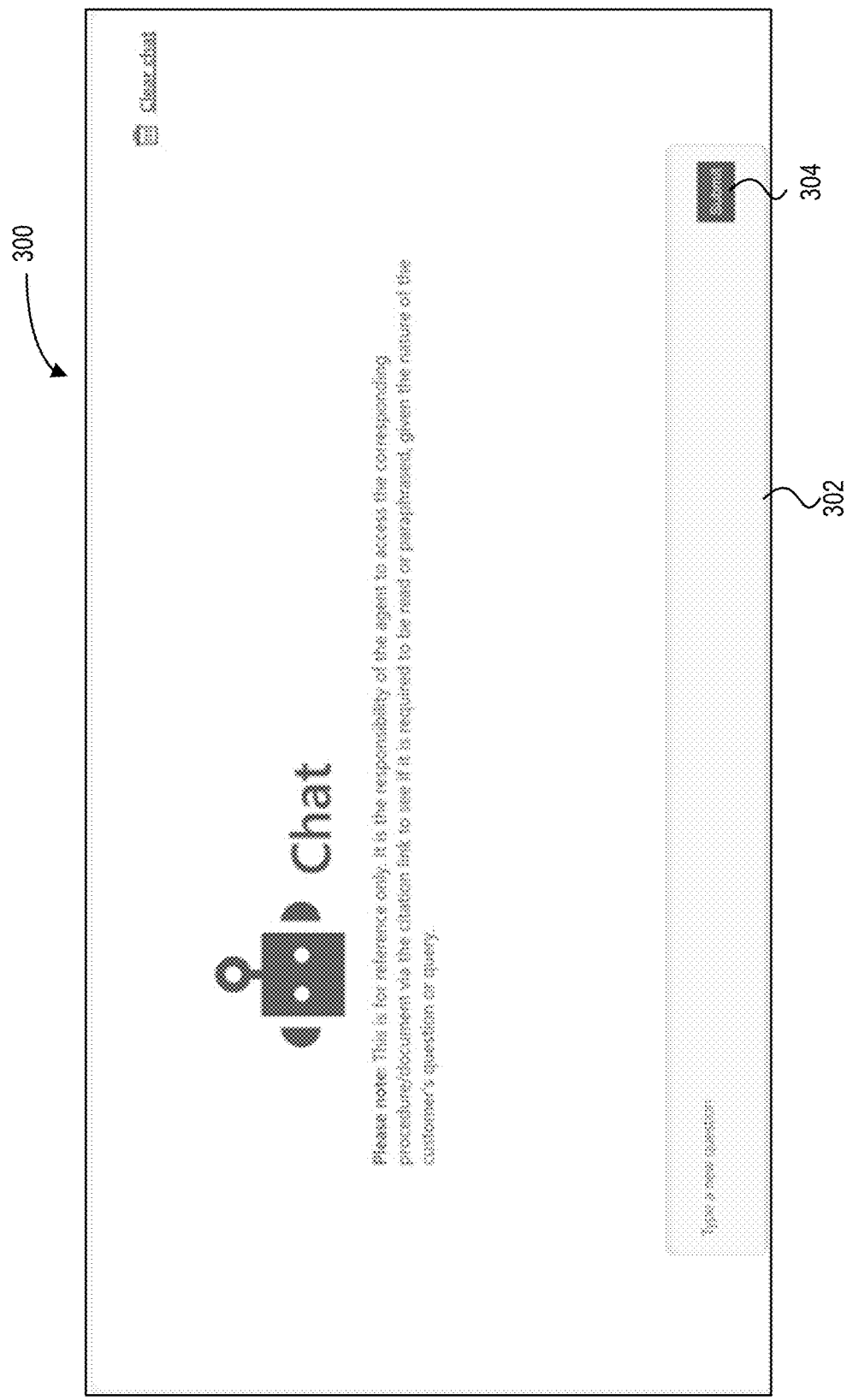
FIG. 3 is a schematic diagram of an example web page for submitting a user query.

The user query 212 may be received from a user via, for example a user interface 230. In some cases, the user query 212 is provided by a client device 190 that is connected over a data communication link 232 to the user interface 230. For example, a user may input a query 212 via a web browser 234 or some other application that operates on the client device 190. In particular, when the user accesses a certain web page via the web browser 234, they may be provided with a text field or the like where the user can enter the query 212. FIG. 3 illustrates an example web page 300 which comprises a text field 302 in which the user can input their query. Once the user has entered their query in the text field 302, the user can press or otherwise activate the submit button 304 to send the query to the cloud-based computing cluster 130 for processing.

LLMs are a class of machine learning models that have been trained on massive amounts of data so that they can understand and generate natural language.

The query modification LLM 214 may be implemented by any LLM that can generate synthetic data for a query. Example LLMs which may be used to implement the query modification LLM 214 include, but are not limited to, a Microsoft Azure™ Open AI LLM (e.g., a GPT-4o, GPT-4 Turbo, GPT-4, or GPT-3.5 Turbo model).

Returning to FIG. 2, the information retrieval system 220 is configured to receive the modified query 226 and identify and retrieve a set of chunks 236 (from the document chunks 224) that are relevant to the modified query 226.

An information retrieval (IR) system is a system that can identify and retrieve documents in a corpus of documents that are relevant to the query by comparing the query (or a representation thereof) to each document (or a representation thereof). An information retrieval system generally starts by creating a search index of the documents in the corpus of documents. Indexing a set of documents is the process of organizing and categorizing documents in a way that makes them easily searchable. The search index generally comprises, searchable fields, which represent information in the documents. There are many different techniques which may be used to index a set of documents. Once the index has been generated, documents relevant to a query are identified by comparing the query (or a representation of the query) to the searchable fields in the search index; generating a relevance score for the documents based on the comparisons; and selecting one or more documents as being relevant to the query based on the relevance score. For example, the information retrieval system may select the k documents with the best relevance scores.

One example technique for indexing a set of documents is tokenization. In tokenization, a tokenizer divides the text in each field of each document into tokens (e.g., each token may represent a single word) and may discard some characters, such as punctuation. An optional token filter may then be used to manipulate the generated tokens. A token filter may be used to, for example: normalize the token (e.g., all text may be converted to small letters); remove stopwords such as "the", "and" and "is"; and/or split some tokens (e.g., tokens that represent phone numbers) into smaller tokens. The tokens may then be stored in an inverted index, which allows for fast, full-text search. An inverted index enables full-text search by mapping all of the unique terms to the document in which they were found. As noted above, there may be an inverted index for each searchable field. So, if there is a title search field and a document search field, there may be an inverted index for each field. When the search index is generated via tokenization, documents relevant to a query are identified by performing simple or full text queries on the inverted indexes. This may comprise parsing the query to identify terms and operations. The inverted indexes are then searched to find matching terms and each match is assigned a relevance score. The result set is then sorted based on a relevance score assigned to each matching document. The relevance score may be based on statistical properties of terms that match. For example, in some cases the relevance score (and thus a ranking of) the documents may be determined in accordance with the Best Match 25 (BM25) algorithm. BM25 is a ranking algorithm that ranks a set of documents based on the query terms appearing in each document, regardless of their proximity within the document.

Another example technique which may be used to index a set of documents is vectorization. In vectorization each document (or each chunk of a document) is converted or transformed, by an embedding model, into a plurality of embeddings which are stored as a multi-dimensional vector. The multi-dimensional vector is an array of (floating point) numbers that captures the semantic meaning of the document (or the chunk of a document). In other words, the multi-dimensional vector is a numeric representation of the content of a document. The multi-dimensional vector can be understood as defining a point in multi-dimensional space, and the distance between two vectors indicates the semantic similarity between the respective documents/queries from which the vectors were generated. Different embedding models may generate a different number of embeddings. For example, the text-embedding-ada-002 embedding model generates 1,536 embeddings for each input (e.g., each chunk).

Different embedding models are also designed to be good at different tasks. For example, a similarity embedding model is good at capturing the semantic similarity between texts; a text search embedding model, such as text-embedding-ada-002, is good at determining whether a long document is relevant to a short query. Since the objective of the information retrieval system 220 of FIG. 2 is to identify documents/chunks that are relevant to an input query, it may be beneficial to use a text search embedding model, such as, but not limited to, text-embeeding-ada-002.

The generated vectors are stored in the search index as a searchable field. When the search index is generated by vectorization, documents relevant to a query can be identified by converting the query into a plurality of embeddings (i.e., multi-dimensional vector), using the same embedding model used to generate the document/chunk embeddings, and comparing the query multi-dimensional vector to the document/chunk multi-dimensional vectors to find the document/chunk multi-dimensional vectors that are closest to the query multi-dimensional vector. In some cases, similarity metrics can be calculated using the Hierarchical Navigatable Small World (HNSW) algorithm or Exhaustive K-nearest neighbors (KNN).

In some cases, tokenization and vectorization may be used in combination. For example, both tokenized search fields and vectorized search fields may be generated and a search may be performed on both types of fields in parallel. The result for an individual document/chunk may be based on the combination of the text search results and the vector search results.

Accordingly, the information retrieval system 220 of FIG. 2 is configured to index the chunks 224 generated from the documents 204 using any suitable method to generate a search index (e.g., tokenization, vectorization, a combination of tokenization and vectorization etc.). The indexing may be performed off-line—i.e., prior to receiving user queries—and may only be performed initially and, optionally, after a change to the set of documents 204—instead of being performed for each query. The information retrieval system 220 is then configured to receive the modified query 226 and identify and retrieve a set of chunks 236 that are relevant to the modified query 226 by searching the search index. Specifically, the information retrieval system 220 is configured to receive a certain number of chunks that are most similar to the modified query 226. The number of chunks that are retrieved may be configurable. Example information retrieval systems which may be used to implement the information retrieval system 220 of FIG. 2 are described below with respect to FIGS. 6, 7 and 9.

While information retrieval systems are very efficient and effective at organizing and sorting through a large corpus of documents, they may not be able to accurately rank the documents they retrieve. Accordingly, the re-ranker LLM 216 is used to rank the set of chunks 236 retrieved by the information retrieval system based on their relevance to the original user query 212. It has been shown that LLMs, such as, but not limited to, GPT-3.5 can achieve top zero-shot performance by prompting general LLMs to re-rank documents. A subset of chunks 240 from the set of chunks is then selected based on the ranking. For example, the top k ranked chunks may be selected to form the subset, wherein k is an integer greater than 1. Thus, the subset of chunks 240 may comprise the most relevant k chunks to the original query, according to the re-ranker LLM 216. In some examples, k may be 3. However, it will be evident that this is just an example. It is noted that the variable k is used numerous times throughout this document as a generally variable and each instance the variable is used, it may be set to a different value. For example, the number of document chunks that are retrieved by the information retrieval system 100 may be different than the number of document chunks that are selected after re-ranking.

Specifically, the re-ranker LLM 216 is provided the original user query 212, the set of chunks 236 retrieved by the information retrieval system 220 and one or more re-ranker (RR) prompts 238 which instruct the re-ranker LLM 216 to rank the set of chunks 236 based on their relevance to the original user query 212. The output of the re-ranker LLM 216 in response to the one or more RR prompts 238 is a ranking of the documents in the set of chunks 236.

The one or more re-ranker (RR) prompts 238 may be configured to cause the re-ranker LLM 216 to perform the ranking in any suitable manner. In some cases, the re-ranker prompt(s) 238 may be configured to cause the re-ranker LLM 216 to perform listwise ranking. In listwise ranking the LLM is provided with all of the chunks to be ranked at the same. Each chunk is identified by a unique identifier like [1], [2], etc. The re-ranker prompt 238 then instructs the re-ranker LLM 216 to generate a ranked permutation of these documents such as [2]>[3]>[1] The following is an example of a listwise ranking prompt.

The following are passages related to a query {{query}}
[1] {{chunk 1}}
[2] {{chunk 2}}
(more passages)
Rank these passages based on their relevance to the query.

In other cases, the one or more RR prompts 238 may be configured to implement pairwise ranking prompting (PRP). PRP has proven to be an efficient method for an LLM to rank a plurality of documents by relevance to a query. As its name suggests, pairwise ranking prompting involves prompting the LLM to compare and rank pairs of documents. The results of the pairwise rankings are then used to generate a final ranking of the documents.

In one implementation of PRP, each document is individually ranked against each other document. A score is then assigned to each document based on the outcome of the pairwise rankings. The scores assigned to the documents are then used to rank the documents. For example, since LLMs may be sensitive to text orders in prompts, for each pair of documents $d_1$ and $d_2$, two rankings may be performed by the re-ranker LLM 216—i.e., a ranking of $d_1$ and $d_2$, and a ranking of $d_2$ and $d_1$. If both rankings produce a consistent result (e.g., both rankings indicate that $d_1$ is more relevant than $d_2$ to a query) then the identified document may be allocated 1 point and the unidentified document is not allocated any points. In contrast, if the rankings produce inconsistent results (e.g., one ranking indicates that $d_1$ is more relevant than $d_2$ to a query, and the other ranking indicates that $d_2$ is more relevant than d to the query) then each document may be allocated 1 point. The total score for a document may then be the sum of the points allocated to that document. The documents can then be ranked based on their total scores.

While the described implementation of PRP is simple to implement, is prompt order independent, and has proven to be quite effective, it requires $O(N^2)$ prompts/calls to the re-ranker LLM 216 per query, where N is the number of documents to be ranked for a query. Accordingly, in some cases PRP may be implemented in another manner. For example, a pairwise sorting algorithm, such as, but not limited, heap sort and bubble sort, may use the output of a pairwise ranking from the re-ranker LLM 216 as a comparator for the sorting algorithm. This reduces the number of prompt/calls to the re-ranker LLM 216 to $O(N \log N)$. In another example, a sorting window approach which starts at a bottom of a list and compares and swaps documents with a stride of 1 based on the output of a pairwise ranking from the re-ranker LLM 216.

Causing the re-ranker LLM 216 to rank a pair of documents (A, B) with respect to a query (Q) may comprise providing the re-ranker LLM 216 with a pair ranking few-shot prompt that comprises one or more example (Q, A, B, answer) quadruples, and instructions for the re-ranker LLM 216 to determine whether A or B is more relevant to Q. An example pair ranking few-shot prompt is shown below.

Given the following question and documents, please generate which document is more relevant for answering the query. The output should be only A or B.
Query: {{Example Query}}
Document A: {{Example Document A}}
Document B: {{Example Document B}}
Answer: {{A or B}}
Now your turn:
Query: {{Synthetic Query}}
Document A: {{Document A}}
Document B: {{Document B}}
Answer: {{A or B}}

There are benefits and drawbacks related to each ranking technique described above. For example, pairwise ranking can be performed efficiently since the pairwise rankings can be performed in parallel, but performing a comparison between each document pair can be computationally expensive. Furthermore, since in pairwise ranking the re-ranker LLM 216 only considers two documents at a time without information about the other documents it may not be able to effectively rank all the documents. In contrast, listwise ranking allows the re-ranker LLM 216 to see all the documents at the same time, but a re-ranker LLM 216 may struggle to perform listwise ranking on larger sets of documents. Testing has shown that listwise ranking can be effectively performed by closed-source LLMs, such as, but not limited to GPT-4.

In other cases, the one or more RR prompts 238 may be configured to cause the re-ranker LLM 216 to perform the ranking in another manner. For example, the one or more RR prompts 238 may be configured to cause the re-ranker LLM

216 to perform pointwise ranking. See also the examples provided in relation to FIG. 10.

In some cases, the one or more re-ranker prompts 238 may cause the re-ranker LLM 216 to, in addition to ranking the documents, select the subset of chunks 240 based on the ranking. However, in other examples, another module, such as a subset selection module (not shown) may be configured to receive the ranking of the set of chunks generated by the re-ranker LLM 216 and select the subset of chunks 240 based on the ranking.

As noted above, LLMs are a class of machine learning models that have been trained on massive amounts of data so that they can understand and generate natural language. The re-ranker LLM 216 may be implemented by any LLM that can perform re-ranking of a set of passages. In some cases, the re-ranker LLM 216 may be implemented by a Microsoft Azure™ Open AI LLM (e.g., a GPT-4O, GPT-4 Turbo, GPT-4, or GPT-3.5 Turbo model). In some cases, the LLM used to implement the re-ranker LLM 216 may be selected based on the ranking technique implemented. For example, GPT-4 has proven to perform pairwise ranking efficiently. In some cases, the re-ranker LLM 216 may be an LLM that has been specifically trained or fine-tuned for re-ranking.

Once the subset of chunks 240 has been selected from the ranking of the set of chunks 236, the generation LLM 218 is used to generate a response 210 to the original query 212 based on the subset of chunks 240. Specifically, the generation LLM 218 is provided with the subset of chunks 240, the original query 212 and a generation (GEN) prompt 242 which instructs the generation LLM 218 to generate a response 210 to the original user query 212 based on the subset of chunks 240. The response 210 may be free-form text that attempts to answer the original user query 212. An example generation prompt 242 is shown below.

Given the following query and passages, please generate a summarized response to the query using the text of the passages. Keep your answer grounded in the facts of the passages.
Query: {query}
Passage 1: {chunk 1}
Passage 2: {chunk 2}
Passage 3: {chunk 3}

Figure 4:
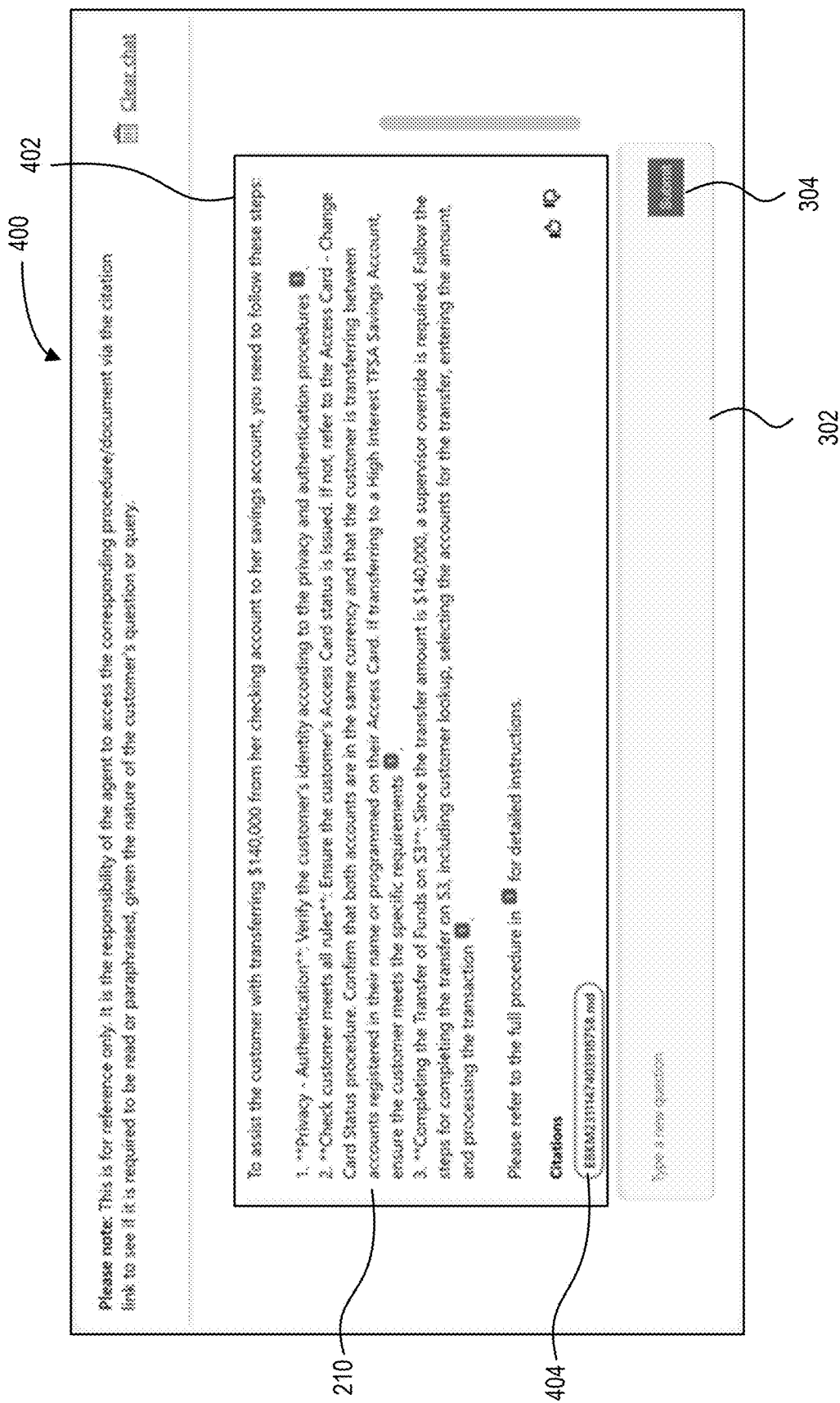
FIG. 4 is a schematic diagram of an example of the web page of FIG. 3 after a response to the user query has been received at the web page.

The response 210 generated by the generation LLM 218 may be provided to a user (e.g., the user that input the original query). In some cases, the response 210 is provided to a client device 190 via the user interface 230. For example, in response to the user inputting the original user query 212 in a web browser 234 or some other application that operates on the client device 190, the response 210 to the query 212 may be provided to the web browser 234, e.g., via a web page. FIG. 4 illustrates an example web page 400, which represents the web page 300 of FIG. 3 after the user has submitted, via text field 302 and button 304, an original query 212 related to how to transfer $140,000 from a client's checking account to her savings account. It can be seen that the web page 400, relative to the web page 300 of FIG. 3, comprises an additional response window 402 in which the response 210 generated by the generation LLM 218 to the original query 212 is displayed. In this example, the response 210 provides step by step instructions on how to implement the transfer. In some cases, the response 210 may comprise a list of documents which were relied on to generate the response 210—in other words, the response 210 may comprise citations. For example, the response 210 shown in FIG. 4 lists a single reference document 404—i.e., document "EBKM231147403918758.md".

Figure 5:
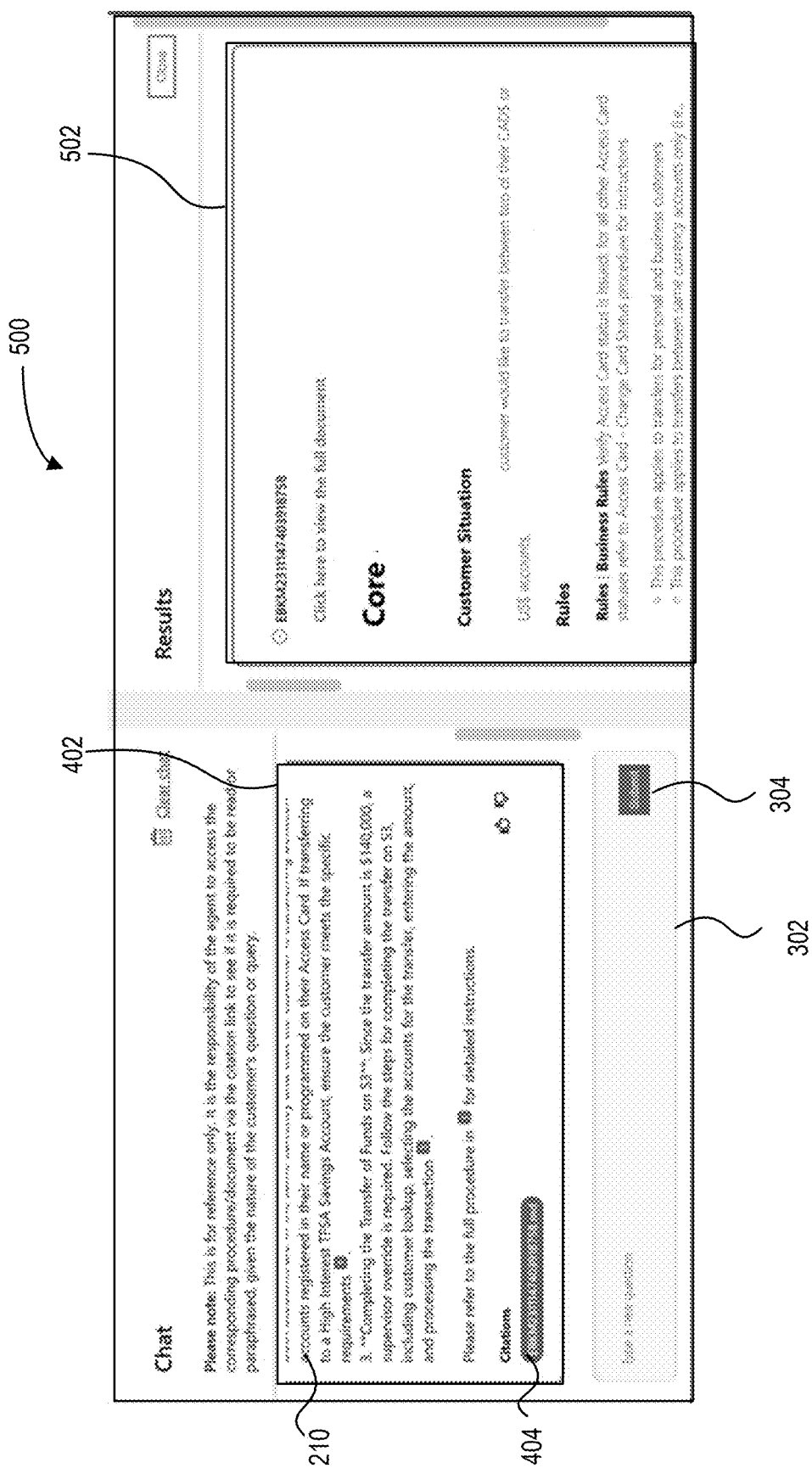
FIG. 5 is a schematic diagram of an example of the web page of FIG. 4 after the user has clicked on a citation hyperlink.

In some cases, each reference document may by hyperlinked in the response 210 such that if the user clicks on, or otherwise selects the reference document, they will be presented with the full text of the reference document. For example, FIG. 5 illustrates an example of a web page 500, which represents the web page 400 of FIG. 4 after the used has clicked on the single reference document 404. It can be seen that the web page 500 of FIG. 5 comprises an additional reference document window 502 which displays the content of the reference document (i.e., document "EBKM231147403918758.md"). In some cases, where the documents are originally in one format (e.g., HTML) and are converted into another format (e.g., markup format) before they are chunked and imported into the information retrieval system, when the user clicks on a reference document in the response window 402, they may be first presented with the document in the converted format (e.g., markup format) in the reference document window 502 with an option to view the document in its original format (e.g., HTML).

Once the user has received the response 210 to the query 212, the user may review the response 210 (and optionally the citations) to determine if the response 210 provides an acceptable and/or appropriate answer to the query 212. If the user determines that the response 210 does not provide an acceptable and/or appropriate answer to the query 212 the user may reformulate the query and resubmit the query to the cloud-based computing device for processing, or the user may manually search the corpus of documents for an answer to the query. If, however, the user determines that the response 210 is acceptable and/or appropriate, the user may take an action based on the response 210. For example, if the response provides information on how to resolve a customer query, the user may instruct the customer on how to resolve the query based on the response, or the user may provide the information in the response to another person (e.g., another employee of the enterprise to which the user is associated) who may then instruct the customer on how to resolve the customer's query.

In some cases, prior to providing the response 210 to the user, an LLM (one of the LLMs in FIG. 2 or a different LLM) may be used to determine whether the response is supported by documents corresponding to the subset of chunks.

Figure 6:
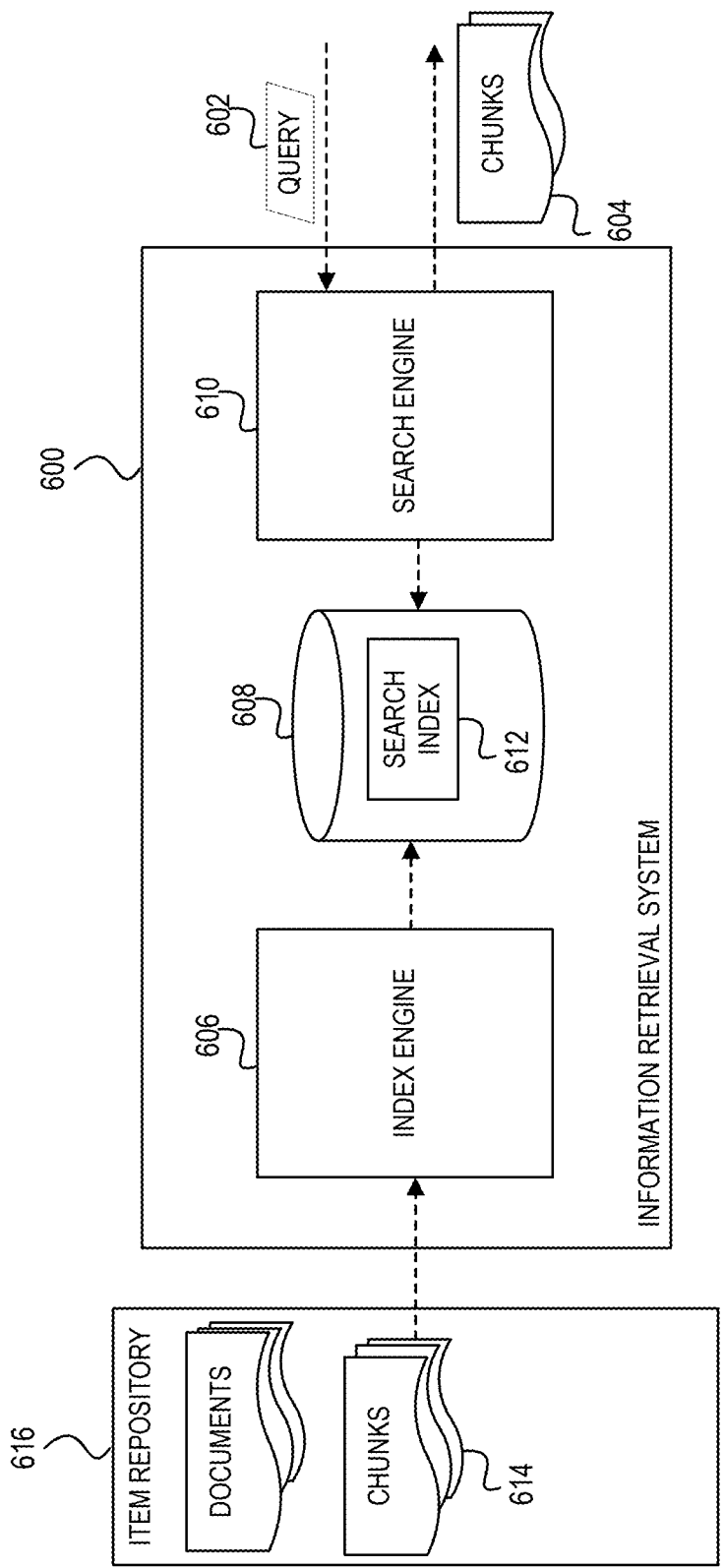
FIG. 6 is a block diagram of a first example information retrieval system.

Reference is now made to FIG. 6 which illustrates a first example information retrieval system 600, which may be used to implement the information retrieval system 220 of FIG. 2. While the information retrieval system 600 may form part of the pipeline 208 of FIG. 2, the information retrieval system 600 of FIG. 6 may also be used independently from the other components of the pipeline 208 of FIG. 2. The information retrieval system 600 of FIG. 6 may be implemented by one or more processors of one or more computers.

The information retrieval system 600 of FIG. 6 is configured to receive a query 602 and identify and retrieve a set of items 604 (which are shown as chunks in FIG. 6) related to that query 602. The information retrieval system 600 of FIG. 6 comprises an index engine 606, a data store 608 and a search engine 610.

The index engine 606 is configured to generate a search index 612 for items 614 that are to be searched. The items 614 may represent a knowledge base of content that can be used to answer queries. The items 614 may be, for example, documents or chunks of documents. Where the information retrieval system 600 of FIG. 6 is used in the pipeline 208 of FIG. 2, the items 614 may be chunks 224 generated from the corpus of documents 204 by the chunking module 222. As described above, generating a search index 612, which may also be referred to as indexing, a set of items is the process of organizing and categorizing the items in a way that makes them easily searchable. The search index 612 comprises, searchable fields and optionally non-searchable fields, which represent information in or about the items 614. A searchable field is a field that is searched by the search engine 610 to identify relevant items whereas a non-searchable field comprises other information about the item, such as, for example, information identifying the item (e.g., a unique item ID) or, where the item is a chunk, information identifying the document (e.g. a unique document ID) which the chunk forms part of. As described above, there are many different techniques for generating a search index for a set of items 614. For example, a search index may be generated by tokenization, vectorization or a combination of tokenization and vectorization. Where the search index 612 is generated by vectorization the search index 612 may comprise, for each item, a searchable vector field which comprises a multi-dimensional vector that represents the item. Once the index engine 606 has generated the search index 612, the search index 612 may be stored in the data store 608.

The search engine 610 is configured to receive a query 602 and search the search index 612 to identify a set of items 604 that are relevant to the query 602. Where the information retrieval system 600 of FIG. 6 is used in the pipeline 208 of FIG. 2, the query 602 is the modified query 226 and the set of items 604 is a set of chunks 236. The search engine 610 is configured to identify the set of items 604 by comparing the query 602 (or a representation of the query 602) to the searchable fields in the search index 612; generating a relevance score for items based on the comparisons; and selecting one or more items as being relevant to the query 602 based on the relevance scores. For example, the search engine 610 may select the k items with the best relevance scores, wherein k is an integer greater than or equal to 1.

How the search engine 610 compares a query to the searchable fields and generates a relevance score therefrom depends on how the search index 612 was generated. For example, as described above, where the search index 612 is generated by the index engine 606 through tokenization such that the search index 612 comprises an inverted index for each field, documents relevant to a query are identified by performing simple or full text queries on the inverted indexes. This may comprise parsing the query to identify terms and operations. The inverted indexes are then searched to find matching terms and each matching is assigned a relevance score. The result set is then sorted based on a relevance score assigned to each matching document. The relevance score may be based on statistical properties of terms that match. For example, the search engine 610 may be configured to identify and retrieve the k most relevant chunks in the set of chunks according to a ranking algorithm such as, but not limited to, Best Match 25 (BM25), wherein k is an integer greater than 1. BM25 is a ranking algorithm that ranks a set of documents/chunks based on the query terms appearing in each document/chunk, regardless of their proximity within the document.

In contrast, where the search index 612 is generated through vectorization such that the search index 612 comprises a multi-dimensional vector for each item 614, items relevant to a query can be identified by converting the query into multi-dimensional vector, using the same embedding model used to generate the item multi-dimensional vectors, and comparing the query multi-dimensional vector to the item multi-dimensional vectors to find the items with the multi-dimensional vectors that are closest to the query multi-dimensional vector. In some cases, the most similar vector can be found through Hierarchical Navigatable Small World (HNSW) algorithm or Exhaustive K-nearest neighbors (KNN).

Where the search index 612 is generated by the index engine 606 via tokenization and vectorization such that the search index 612 comprises at least one token-based search field and at least one vector search fields, the search engine 610 may perform a search on both types of fields in parallel and the result for an individual item may be based on the combination of the text search relevance score assigned to that item and the vector search relevant score assigned to that item.

The search performed by the search engine 610 identifies (e.g., via unique item numbers) the items 604 that are most relevant to the query. In some cases, the search engine 610 may simply output information that identifies the items 604 that are most relevant to the query. In other cases, the search engine 610 may retrieve the identified items 604 and provide those items 604 to the query requestor. In some cases, the data store 608 may be configured to store, in addition to the search index 612, a copy of the items 614 and the search engine 610 may be configured to retrieve the identified items (i.e., those identified as being most relevant to the query 602) from the data store 608. In other cases, the search engine 610 may have access to an item repository 616 where the items 614 are stored, and the search engine 610 may be configured to retrieve the identified items 604 from the item repository 616.

Figure 7:
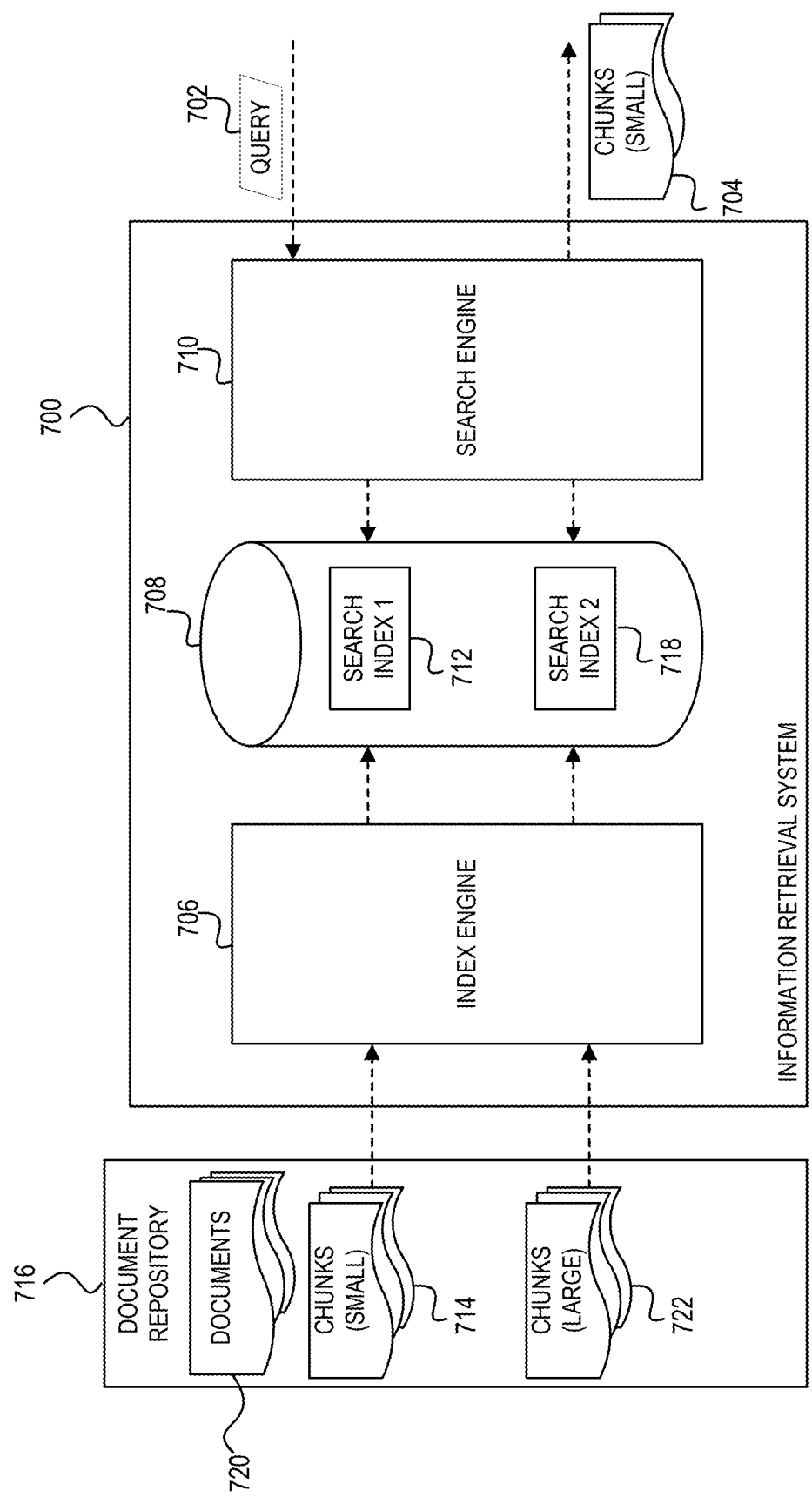
FIG. 7 is a block diagram of a second example information retrieval system.

Reference is now made to FIG. 7 which illustrates a second example information retrieval system 700, which may be used to implement the information retrieval system 220 of FIG. 2. While the information retrieval system 700 may form part of the pipeline 208 of FIG. 2, the information retrieval system 700 of FIG. 7 may also be used independently from the other components of the pipeline 208 of FIG. 2. The information retrieval system 700 of FIG. 7 may be implemented by one or more processors of one or more computers.

The information retrieval system 700 of FIG. 7 is similar to the information retrieval system 600 of FIG. 6 in that the information retrieval system 700 is configured to receive a query 702 and retrieve a set of items 704 (from a knowledge base) related to that query; and the information retrieval system 700 comprises an index engine 706, a data store 708 and a search engine 710. However, instead of the index engine 706 being configured to generate a single index 712 for searching the knowledge base, the index engine 706 is configured to generate multiple search indexes 712, 718 for searching the knowledge base; and the search engine 710 is configured to first perform a search on one search index 718, and then perform a filtered search on the other search index 712 based on the results of the first search.

Specifically, instead of a corpus of documents 720 representing a knowledge base being subdivided (e.g., by a chunking module, such as the chunking module 222 of FIG. 2) into a single set of chunks 714, the corpus of documents 720 are subdivided into a first set of chunks 714 with a first size (or a first maximum size), and a second, separate, set of chunks 722 with a second size (or a second maximum size) which is larger than the first size. The first and second sets of chunks 714, 722 may be stored in an item/document repository 716 where they can be accessed by the information retrieval system 700. Each small chunk 714 and each large chunk 722 corresponds to a document 720. Each small chunk 714 and each large chunk 722 may be stored in an item/document repository 716 along with information identifying the corresponding document (i.e., the document that the chunk was generated from).

The index engine 706 is then configured to generate a search index 712, 718 for each set of chunks 714, 722. Specifically, the index engine 706 is configured to generate a first search index 712 for the set of smaller chunks 714 and generate a second search index 718 for the set of larger chunks 722. Each search index 712, 718 comprises, searchable fields and optionally non-searchable fields, which represent information in or about the corresponding chunks 714, 722. Preferably, each search index 712, 718 comprises one or more non-searchable fields which uniquely identify each chunk and each document that chunk is associated with.

As described above with respect to the information retrieval system 220 of FIG. 2 and the information retrieval system 600 of FIG. 6, there are many different techniques for generating a search index for a set of items (e.g., chunks) 714, 722. For example, a search index may be generated by tokenization, vectorization or a combination of tokenization and vectorization. Any of the described techniques, or any other known technique may be used to generate the search indexes 712, 718. Where the search indexes 712, 718 are generated by vectorization, each search index 712, 718 may comprise, for each chunk in the corresponding set of chunks 714, 722, a searchable vector field which comprises a multi-dimensional vector that represents the chunk. Preferably, the two search indexes 712, 718 are generated by the same technique—e.g., both search indexes 712, 718 are generated through the tokenization technique or both are generated through the vectorization technique. Once the index engine 706 has generated the search indexes 712, 718 the search indexes 712, 718 may be stored in the data store 708.

The search engine 710 is configured to receive a query 702 and perform a multi-stage search on the two search indexes 712, 718 to identify chunks 704 in the first set of chunks 714 (i.e., small chunks) that are relevant to the query 702. Where the information retrieval system 700 of FIG. 7 is used in the pipeline 208 of FIG. 2, the query 702 is the modified query 226 and the first set of chunks 714 is the set of chunks 236.

Specifically, the search engine 710 is configured to perform a first search on the second search index 718 (i.e., the search index for the set of large chunks 722) to identify chunks in the second set of chunks 722 (i.e., large chunks) that are relevant to the query 702; and then perform a second, filtered, search on the first search index 712 (i.e., the search index for the set of small chunks 714) to identify chunks in the first set of chunks 714 (i.e., small chunks) that are relevant to the query 702, wherein the filter criteria are selected based on the results of the first search (i.e. the results of the search performed on the search index 718 for the second set of chunks 722).

In some cases, the filtered criteria for the filtered search may be selected so that the search engine 710 only searches for chunks in the first set of chunks 714 (i.e., small chunks) that correspond to a document that was identified in the first search. Specifically, the first search (the search performed on the search index 718 for the large chunks) identifies large chunks relevant to the query 702. Each of the identified large chunks will have a corresponding document. The unique documents that correspond to at least one identified large chunk forms a set of relevant documents. The filter criteria may then be configured so that the second search (the search performed on the search index 712 that corresponds to the small chunks) is limited to the small chunks that correspond to a document in the set of relevant documents identified by the first search. Accordingly, the second, filtered, search performed on the first search index 712 may be performed by filtering on the document IDs of the relevant documents identified by the first search.

Figure 8:
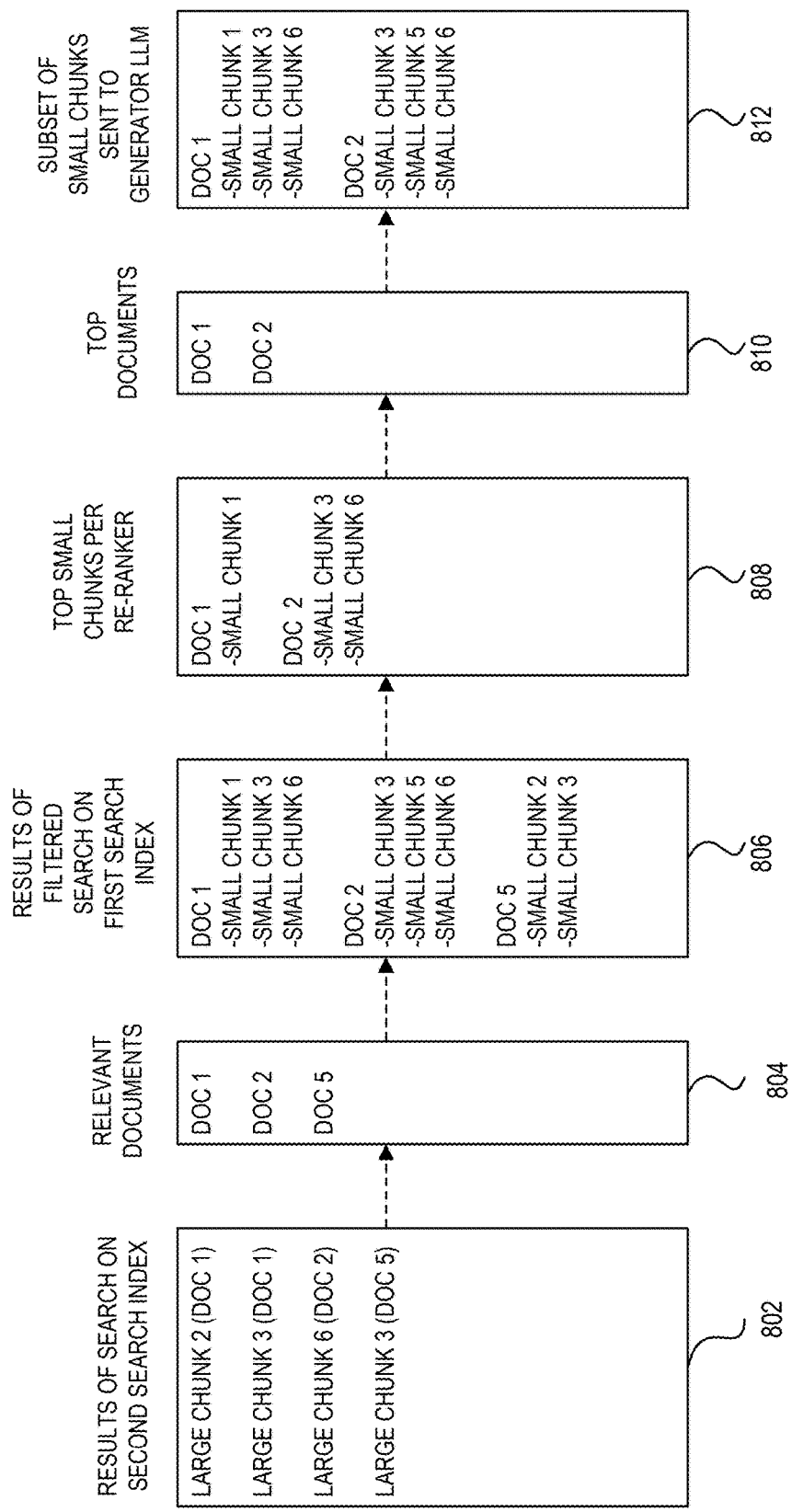
FIG. 8 is a schematic diagram illustrating a two-stage search performed using multiple search indexes for the same corpus of documents.

For example, as shown in FIG. 8, a first search may be performed on the second search index 718 (the search index for the large chunks 722) to identify large chunks that are related to a query. The first search may identify a set of large chunks 802—e.g., large chunk 2 of document 1, large chunk 3 of document 1, large chunk 6 of document 2 and large chunk 3 of document 5. A set of relevant documents 804 may then be identified from the identified set of large chunks. As noted above, a relevant document is a document which corresponds to at least one of the large chunks identified by the first search. In this example, the relevant documents 804 are documents 1, 2 and 5 since each of these documents corresponds to at least one large chunk identified by the first search. A second search may then be performed on the first search index 712 (the search index for the small chunks 714) with a filter that only includes the relevant documents 804 (i.e., documents 1, 2 and 5). The second search may identify a set of small chunks 806 in the relevant documents—i.e., small chunks in documents 1, 2 and 5. For example, the second search may identify small chunks 1, 3 and 6 in document 1, small chunks 3, 5 and 6 in document 2, and small chunks 2 and 3 in document 5.

This two-phase search combines advantages of large and small chunking methods. Specifically, using larger chunks may result in better recall and using smaller chunks may result in better precision. Precision measures how often a model or system makes correct positive predictions. Precision can be calculated by dividing the number of correct positive predictions (true positives) by the total number of instances the model predicted as positive (both true and false positives) as shown in equation (1) where TP is the number of true positives, TN is the number of true negatives, FP is the number of false negatives, and FN is the number of false negatives. Recall, which may also be referred to as sensitivity or the true positive rate (TPR), measures how often a model or system identifies positive instances from the actual positive samples in the dataset. Recall can be calculated by dividing the number of true positives by the number of positive instances (true positives+false negatives) as shown in equation (2).

$$\text{Precision} = \frac{TP}{TP + FP} \quad (1)$$

$$\text{Recall} = \frac{TP}{TP + FN} \quad (2)$$

The search engine 710 is configured to perform each of the first and second searches by comparing the query 702 (or a representation of the query 702) to the searchable fields in the corresponding search index 712, 718; generating a relevance score for chunks in the corresponding set of chunks 714, 722 based on the comparisons; and selecting one or more of the chunks in the corresponding set of chunks 714, 722 as being relevant to the query 702 based on the relevance scores. For example, the search engine 710 may select the k documents with the best relevance scores, wherein k is an integer greater than or equal to 1.

How the search engine 710 compares a query to the searchable fields in a search index 712, 718 and generates a relevance score therefrom depends on how the search index 712, 718 was generated. Different methods which can be used for different search indexes were described above with respect to the information retrieval system 220 of FIG. 2 and the information retrieval system 600 of FIG. 6. For example, as described above, where a search index is generated through tokenization such that the search index comprises an inverted index for each searchable field, chunks relevant to a query are identified by performing simple or full text queries on the inverted indexes. This may comprise parsing the query to identify terms and operations. The inverted indices are then searched to find matching terms-thus the chunks that comprises the matching terms. A document that has one or more matching terms is assigned a relevance score according to, for example, a ranking algorithm, such as, but not limited to, BM25.

In contrast, as described above, where a search index is generated through vectorization such that the search index comprises a multi-dimensional vector for each chunk, chunks relevant to a query can be identified by converting the query into a multi-dimensional vector, using the same embedding model used to generate the multi-dimensional vectors for the chunks, and comparing the query multi-dimensional vector to the chunk multi-dimensional vectors to find the chunks with the multi-dimensional vectors that are closest to the query multi-dimensional vector (using, for example HNSW or KNN).

Also, as described above, where a search index is generated via tokenization and vectorization such that the search index comprises tokenized search fields and vector search fields, the search engine 710 may perform searches on both types of fields in parallel and the result for an individual chunk may be based on the combination of the text search score assigned to that chunk and the vector search score assigned to that chunk. Any of the methods described above, or any other known method, can be used to compare a query 702 to the searchable fields in a search index 712, 718.

The search performed by the search engine 710 identifies (e.g., via unique chunk numbers) a set of small chunks 704 that are most relevant to the query 702. In some cases, the search engine 710 may simply output information that identifies the set of small chunks 704 deemed to be most relevant to the query. In other cases, the search engine 710 may retrieve the identified small chunks 704 and output those small chunks 704. In some cases, the data store 708 may be configured to store, in addition to the search indexes 712, 718, a copy of the set of small chunks 714 and the search engine 710 may be configured to retrieve the identified small chunks 704 from the data store 708. In other cases, the search engine 710 may have access to a document repository 716 where the small chunks 714 are stored, and the search engine 710 may be configured to retrieve the identified small chunks 704 from the document repository 716.

Where the information retrieval system 700 of FIG. 7 is used in the pipeline 208 of FIG. 2—i.e., it is used to implement the information retrieval system 220 of FIG. 2—the small chunks 704 identified by the information retrieval system 700 may be provided to the re-ranker LLM 216 for ranking. As described above, a subset of the small chunks may then be selected based on the ranking and forwarded to the generation LLM 218. In some cases, as described above, the subset of small chunks that are forwarded to the generation LLM 218 (i.e., the subset of chunks 240 in FIG. 2) may be the k chunks with the highest ranking according to the re-ranker LLM 216 where k is an integer greater than or equal to 1. However, in other cases, the ranking performed by the re-ranker LLM 216 may be first used to identify the top documents, and then all or a portion the small chunks identified by the information retrieval system 700 for those top documents may be provided to the generation LLM 218. In some cases, the top documents may be the documents that are related to the top x (e.g., top 3) ranked small chunks according to the re-ranker LLM 216. For example, as shown in FIG. 8, if the re-ranker identifies (at 808) that the top three small chunks of the small chunks identified by the information retrieval system 700 are small chunk 1 of document 1, small chunk 3 of document 3 and small chunk 6 of document 2 then the top documents (at 810) may be documents 1 and 2. Then (at 812) all or a portion of the chunks in the results of the second search (at 806) may form the subset. Specifically, in the example shown in FIG. 8, all of the chunks in the results of the second search for the top documents are selected to form the subset. However, in other cases, the top documents may be identified from the ranking of the small chunks in another manner.

Figure 9:
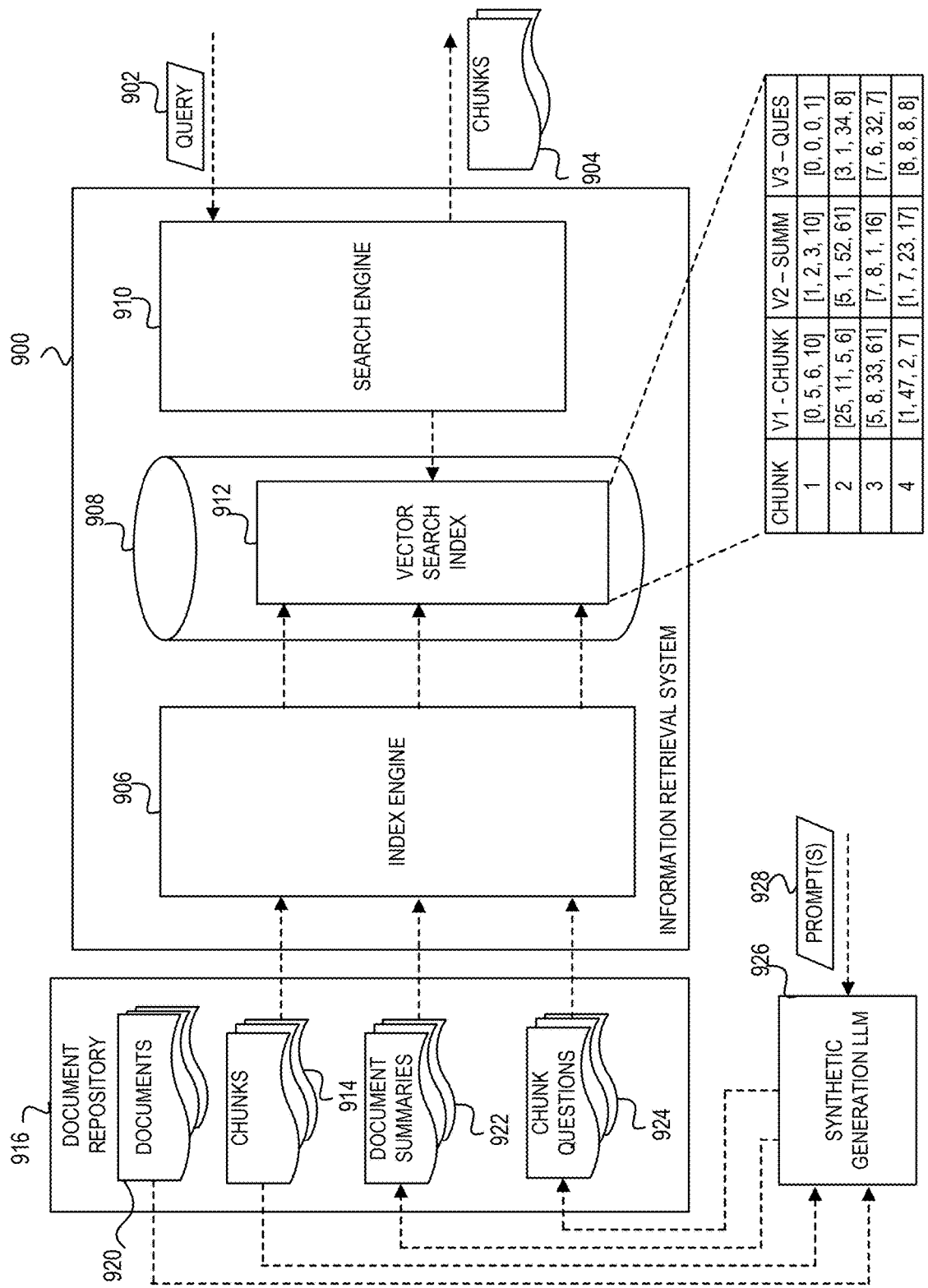
FIG. 9 is a block diagram of a third example information retrieval system.

Reference is now made to FIG. 9 which illustrates a third example information retrieval system 900, which may be used to implement the information retrieval system 220 of FIG. 2. While the information retrieval system 900 may form part of the pipeline 208 of FIG. 2, the information retrieval system 900 of FIG. 9 may also be used independently from the other components of the pipeline 208 of FIG. 2. The information retrieval system 900 of FIG. 9 is similar to the information retrieval system 600 of FIG. 6 in that the information retrieval system 900 is configured to receive a query 902 and retrieve a set of items 904 (from a collection of items 914 that form a knowledge base) that are related to that query; and the information retrieval system 900 comprises an index engine 906, a data store 908 and a search engine 910. However, the index engine 906 of FIG. 9 is specifically configured to generate a vector search index 912 for a collection of items 914 (e.g., a collection of chunks) wherein the vector search index comprises multiple vectors per item (e.g., per chunk); and the search engine 910 is configured to perform a multi-vector search on the vector search index to identify items that are relevant to a query. One of the vectors for an item is generated from (and represents) the item (e.g., chunk) itself, and at least one of the other vectors for an item is generated from (and represents) a piece of synthetic information 922, 924 generated by an LLM for that item (e.g., chunk).

Specifically, a synthetic generation LLM 926 is used to generate at least one piece of synthetic information for each item to be searched (e.g., each chunk in the collection of chunks 914). This may comprise providing each item (e.g., each chunk) to the synthetic generation LLM 926 along with a synthetic generation prompt 928 that instructs the synthetic generation LLM 926 to generate a piece of synthetic information 922, 924 related to the item (e.g., chunk). The piece of synthetic information that the synthetic generation LLM 926 is instructed to generate by the synthetic generation prompt 928 may comprise a summary of the item (e.g., chunk), keywords for the item (e.g., chunk), and one or more questions that can be answered by the item (e.g., chunk). The synthetic generation prompt 928 may be a zero-shot prompt or a few shot prompt. An example zero-shot synthetic generation prompt 928 which may be used to instruct the synthetic generation LLM 926 to generate a summary of an item (e.g., chunk) is shown below.

Write a summary for the given passage: {chunk}

An example few-shot synthetic generation prompt 928 which may be used to instruct the synthetic generation LLM 926 to generate a query that can be answered by an item (e.g., chunk) is shown below. The example prompt induces the synthetic generation LLM 926 to generate a query that aligns with (e.g., is in the same format and style as) the example document-query pairs. Generally, the higher the quality and more diverse the example document-query pairs, the more likely the synthetic generation LLM 926 will generate relevant and informative queries.

> Please ask a good and specific question that can be answered with the given passage.
> Document 1: {{Example Passage 1}}
> Query 1 {{Example Query 1}}
> Document 2: {{Example Passage 2}}
> Query 2: {{Example Query 2}}
> Now it is your turn:
> Document 3: {{Passage}}
> Query 3:

Where the items that are searched are chunks 914 which are generated from a corpus of documents 920, a piece of synthetic information for each chunk may be generated by providing each document of the corpus of documents 920 to the synthetic generation LLM 926 along with a synthetic generation prompt 928 that instructs the synthetic generation LLM 926 to generate a summary 922 of the document. A document summary 922 generated by the synthetic generation LLM 926 can be used as a piece of synthetic information for each chunk that was generated from that document. For example, if a document is sub-divided into five chunks, then the summary of that document can be used as a piece of synthetic information for each of the five chunks.

Once one or more pieces of synthetic information 922, 924 has/have been generated for each item (e.g., each chunk) 914, the piece(s) of synthetic information 922, 924 may be stored in a document repository 916 along with the items (e.g., chunks) 914. In some cases, the synthetic information 922, 924 may be stored separately from the items (e.g., chunk) 914 but with information that links each piece of synthetic information with its corresponding item (e.g., chunk) 914. For example, each piece of synthetic information 922, 924 may be stored in the document repository 916 along with information identifying the corresponding item (e.g., chunk) 914.

As noted above, LLMs are a class of machine learning models that have been trained on massive amounts of data so that they can understand and generate natural language. The synthetic generation LLM 926 may be implemented by any LLM that can generate synthetic data for a passage. In some cases, the synthetic generation LLM 926 may be implemented by a Microsoft Azure™ Open AI LLM (e.g., a GPT-4o, GPT-4 Turbo, GPT-4, or GPT-3.5 Turbo model). When the information retrieval system 900 is used to implement the information retrieval system 220 of FIG. 2 such that it forms part of the pipeline 208, the synthetic generation LLM 926 may be combined with one of the other LLMs 214, 216, 218 in the pipeline 208. In other words, a single LLM may be used to perform the functions of the synthetic generation LLM 926 and the query modification LLM 214, the re-ranker LLM 216, and/or the generation LLM 218.

The index engine 906 is configured to generate a vector search index 912 for the items (e.g., chunks) 914 that comprises multiple vectors per item (e.g., chunk) 914. Specifically, the index engine 906 is configured to, for each item (e.g., each chunk), convert, using an embedding model, that item (e.g., chunk) 914 into a set of embeddings (i.e., a multi-dimensional vector) and each piece of synthetic information for that item (e.g., chunk) 914 into a set of embeddings (i.e., a multi-dimensional vector). Each multi-dimensional vector is stored in the vector search index 912 as a searchable field. The number of multi-dimensional vectors for each item (e.g., chunk) 914 in the vector search index 912 will depend on the number of different pieces of synthetic information generated for each item (e.g., chunk) 914. For example, as shown in FIG. 9, if for each item (e.g., chunk) there is an associated synthetic summary 922 and an associated synthetic question 924, then the vector search index 912 will comprise, for each item (e.g., chunk) 914 three vectors—a first vector ("V1—Chunk") that represents the item (e.g., chunk) 914 itself, a second vector ("V2—SUMM") that represents the summary, and a third vector ("V3—QUES") that represents the question. It will be evident that this is an example only and that there may be only one piece of synthetic information associated with each item (e.g., chunk). Each type of vector may be said to be in a different vector field.

The vector search index 912 may also comprise one or more non-searchable fields. For example, where the items that are to be searched are chunks, the vector search index 912 may also comprise one or more non-searchable fields which uniquely identify each chunk and its corresponding document. Once the index engine 906 has generated the vector search index 912, the vector search index 912 may be stored in the data store 908.

The search engine 910 is configured to receive a query 902 and perform a multi-vector search on the vector search index 912 to identify a set of items (e.g., chunks) 904 relevant to the query. Where the information retrieval system 900 of FIG. 9 is used in the pipeline 208 of FIG. 2, the query 902 is the modified query 226 and the items (e.g., chunks) 914 is the set of chunks 236.

Performing a multi-vector search means that there are multiple vectors for each item (e.g., chunk) to be searched, and the search engine 910 takes each vector associated with an item (e.g., chunk) into account in determining which are the most relevant items (e.g., chunks) to a query. The search engine 910 is configured to perform the multi-vector search by first converting, using the same embedding model used to generate the vectors for the items (e.g., chunks), the query 902 into a plurality of embeddings (i.e., into a multi-dimensional vector) that mathematically represents the semantic meaning of the query 902. The search engine 910 then compares the multi-dimensional vector for the query to the multi-dimensional vectors in all vector search fields of the vector search index 912 to identify the items (e.g., chunks) that are most relevant to the query.

In some cases, this may comprise performing a separate vector search on each vector field to identify the k items (i.e., chunks) with multi-dimensional vectors in that field that are closest to the query multi-dimensional vector; and then combining the results of the different vector searches. For example, if, as shown in FIG. 9, there are three vector fields, then a vector search may be performed on the first vector field ("V1—Chunk") to identify a first set of k items (i.e., chunks) with multi-dimensional vectors in that field that are closest to the query multi-dimensional vector, wherein items (e.g., chunks) are ranked based on their closeness; a vector search may also be performed on the second vector field ("V2—SUMM") to identify a second set of k items (i.e., chunks) with multi-dimensional vectors in that field that are closest to the query multi-dimensional vector, wherein the items (i.e., chunks) are ranked based on their closeness; and a vector search may also be performed on the third vector field ("V3—QUES") to identify a third set of k items (i.e., chunks) with multi-dimensional vectors in that field that are closest to the query multi-dimensional vector, wherein the items (i.e., chunks) are ranked based on their closeness. The set of k items (i.e., chunks) with multi-dimensional vectors in a particular field that are closest to the query multi-dimensional vector may be identified using any suitable algorithm such, as but not limited to KNN and HNSW. The distance between multi-dimensional vectors may be measured using any suitable metric such as, but not limited to, cosine angle, Euclidean distance and DotProduct.

Once a vector search has been performed on each vector field, such that there is a ranked list of k items (e.g., chunks) for each vector field, the results of the vector searches are combined to get a final list of k items that are most relevant to the query. In one example, the results may be combined using a re-ranker technique or algorithm, such as, but not limited to, Reciprocal Rank Fusion (RRF) with or without weighted scoring. In RRF each item (e.g., chunk), in a ranked list of k items, is assigned a reciprocal rank score based on its position in the list. The score is calculated as 1/(rank+m), where rank is the position of the items in the list and m is a constant that may be empirically selected. Then, for each item (e.g., chunk), its reciprocal rank scores are combined to get a final combined score. The items are then ranked based on their combined scores. For example, in some cases the combined score for an item (e.g., chunk) may be the sum of its reciprocal scores. In other cases, the reciprocal score for different vector fields may be weighted differently. For example, the ranking for the chunk vector field may be given more weight than the ranking for the summary vector field. In these cases, the combined score for an item (e.g., chunk) may be a weighted sum of its reciprocal scores.

It will be evident to a person of the art that this is an example only and that other techniques or algorithms may be used to combine the results of the vector searches. For example, in some cases, each item in a ranked list of k items may be assigned a relevance score based on the distance between its multi-dimensional vector and the query multi-dimensional vector and a final relevance score for an item (e.g., chunk) may be generated by combining (e.g., summing) the relevance scores for the item (e.g., chunk).

The multi-vector search performed by the search engine 910 identifies (e.g., via unique chunk numbers) a set of items (e.g., chunks) 904 that are most relevant to the query 902. In some cases, the search engine 910 may simply output information that identifies the set of items (e.g., chunks) 904 deemed to be most relevant to the query 902. In other cases, the search engine 910 may retrieve the identified items (e.g., chunks) 904 and output those items (e.g., chunks) 904. In some cases, the data store 908 may be configured to store, in addition to the vector search index 912, a copy of the original items (e.g., chunks) 914 and the search engine 910 may be configured to retrieve the identified items (e.g., chunks) 904 from the data store 908. In other cases, the search engine 910 may have access to a document repository 916 where the items (e.g., chunks) 914 are stored, and the search engine 910 may be configured to retrieve the identified items (e.g., chunks) 904 from the document repository 916.

Where the information retrieval system 900 of FIG. 9 is used in the pipeline 208 of FIG. 2—i.e., the information retrieval system 900 of FIG. 9 is used to implement the information retrieval system 220 of FIG. 2—the chunks 904 identified by the information retrieval system 900 may be provided to the re-ranker LLM 216 for ranking.

Figure 10:
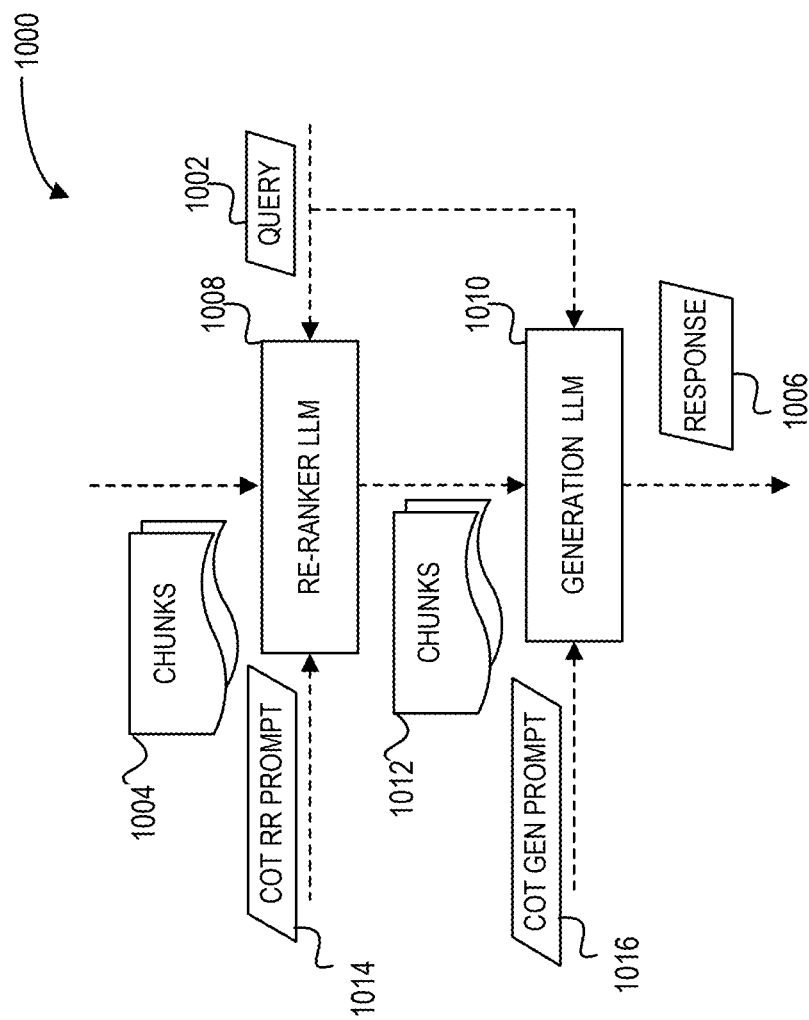
FIG. 10 is a block diagram of an example LLM-based system to generate a response to a query based on a set of relevant document chunks.

Reference is now made to FIG. 10 which illustrates an example response generation system 1000 for generating a response to a query based on a set of chunks generated from a corpus of documents. The response generation system 1000 of FIG. 10 may be used to implement the backend portion of the pipeline 208 of FIG. 2 (i.e., the re-ranking, subset selection and response generation) or the response generation system 1000 of FIG. 10 may be used in another system. For example, the response generation system 1000 of FIG. 10 may be used in another RAG system to perform the response generation.

Specifically, the response generation system 1000 of FIG. 10 is configured to receive a user query 1002, a set of chunks 1004 (e.g., generated from documents in a corpus of documents) that have been deemed relevant to the user query 1002 (e.g., by an information retrieval system), and generate a response 1006 to the user query 1002 based on the set of chunks 1004 using one or more LLMs 1008, 1010. Like the pipeline 208 of FIG. 2, the system 1000 of FIG. 10 comprises a re-ranker LLM 1008 and a generation LLM 1010. The re-ranker LLM 1008 is used to rank the set of chunks based on their relevance to the query 1002. A subset 1012 of the set of chunks 1004 is then selected based on the ranking. The generation LLM 1010 is then used to generate a response 1006 to the query 1002 based on the subset of chunks 1012. However, unlike the pipeline 208 described above with respect FIG. 2, one or more of the re-ranker LLM 1008 and the generation LLM 1010 is configured to perform their task (e.g., ranking or response generation) via chain-of-thought prompting, which may also be referred to as chain-of-notes prompting. Chain-of-thought (CoT) prompting allows LLMs to solve complex reasoning tasks by instructing the LLM to generate an explanation before the final prediction/output to draw out the reasoning capabilities of LLMs. This forces the LLM to break down a complex problem into intermediate steps.

Specifically, in some examples the re-ranker LLM 1008 of FIG. 10 may be used to rank the set of chunks 1004 based on their relevance to the query 1002 by providing the re-ranker LLM 1008 with the set of chunks 1004, the query 1002 along with a CoT re-ranker (RR) prompt 1014 that instructs the re-ranker LLM 1008 to, for each chunk in the set of chunks 1004, explain (using the chunk) why that chunk is relevant to the query 1002 and assign a relevance rating thereto, and then rank the set of chunks 1004 based on their relevance to the query 1002. Such a CoT re-ranker prompt 1014 forces the re-ranker LLM 1008 to stay focused on the content of relevance when ranking the chunks. The CoT re-ranker prompt 1014 may also specify that the explanation as to why a chunk is relevant is to be limited to the content of the chunk.

Once the re-ranker LLM 1008 has generated a ranking of the set of chunks, a subset of chunks 1012 are selected based on the ranking. In some cases, the CoT re-ranker prompt 1014 may cause the re-ranker LLM 1008 to both rank the chunks 1004 and select the subset of chunks 1012 based on the ranking. However, in other examples, another module, such as a subset selection module (not shown) may be configured to receive the ranking of the set of chunks generated by the re-ranker LLM 1008 and select the subset of chunks 1012 based on the ranking. The subset of chunks 1012 may be selected from the ranking in any suitable manner, such as those described above with respect to FIGS. 2 and 8.

As noted above, LLMs are a class of machine learning models that have been trained on massive amounts of data so that they can understand and generate natural language. The re-ranker LLM 1008 may be implemented by any LLM that can perform re-ranking of a set of passages. In some cases, the re-ranker LLM 216 may be implemented by a Microsoft Azure™ Open AI LLM (e.g., a GPT-4o, GPT-4 Turbo, GPT-4, or GPT-3.5 Turbo model).

Once the subset of chunks 1012 has been selected based on the ranking, the generation LLM 1010 is used to generate a response 1006 to the query 1002 based on the subset of chunks 1012. In some cases, this may comprise providing the generation LLM 1010 the subset of chunks 1012, the query 1002 and a generation prompt as described above with respect to FIG. 2. However, in other cases, this may comprise providing the generation LLM 1010 with the set of chunks 1004, the query 1002 and a CoT generation (GEN) prompt 1016. The CoT generation prompt 1016 is configured to cause the generation LLM 1010 to generate the response 1006 to the query 1002 based on the subset of chunks 1012 through a step-by-step process. Specifically, the CoT generation prompt 1016 instructs the generation LLM 1010 to explain, using the content of the chunk, why each chunk in the subset of chunks 1012 is relevant to the query 1002 and assign a relevance rating thereto, and then generate a response 1006 to the query based on the set of chunks. Such a CoT generation prompt 1016 forces the generation LLM 1010 to stay focused on the content of relevance when generating the response 1006. It also forces the generation LLM 1010 identify the relevant sections of the chunks before generating a response.

As noted above, LLMs are a class of machine learning models that have been trained on massive amounts of data so that they can understand and generate natural language. The generation LLM 1010 may be implemented by any LLM that can generate a response to a query using provided passages. In some cases, the generation LLM 1010 may be implemented by a Microsoft Azure™ Open AI LLM (e.g., a GPT-4o, GPT-4 Turbo, GPT-4, or GPT-3.5 Turbo model).

In other examples, a CoT prompt may not be used to cause the re-ranker LLM 1008 to rank the set of chunks 1005 (e.g., in contrast the re-ranker LLM 1008 may be used in the same manner as the re-ranker LLM 216 of FIG. 2, as described above, to rank the set of chunks 1004) but a CoT prompt (such as that described above) may be used to cause the generation LLM 1010 to generate the response 1006.

Figure 11:
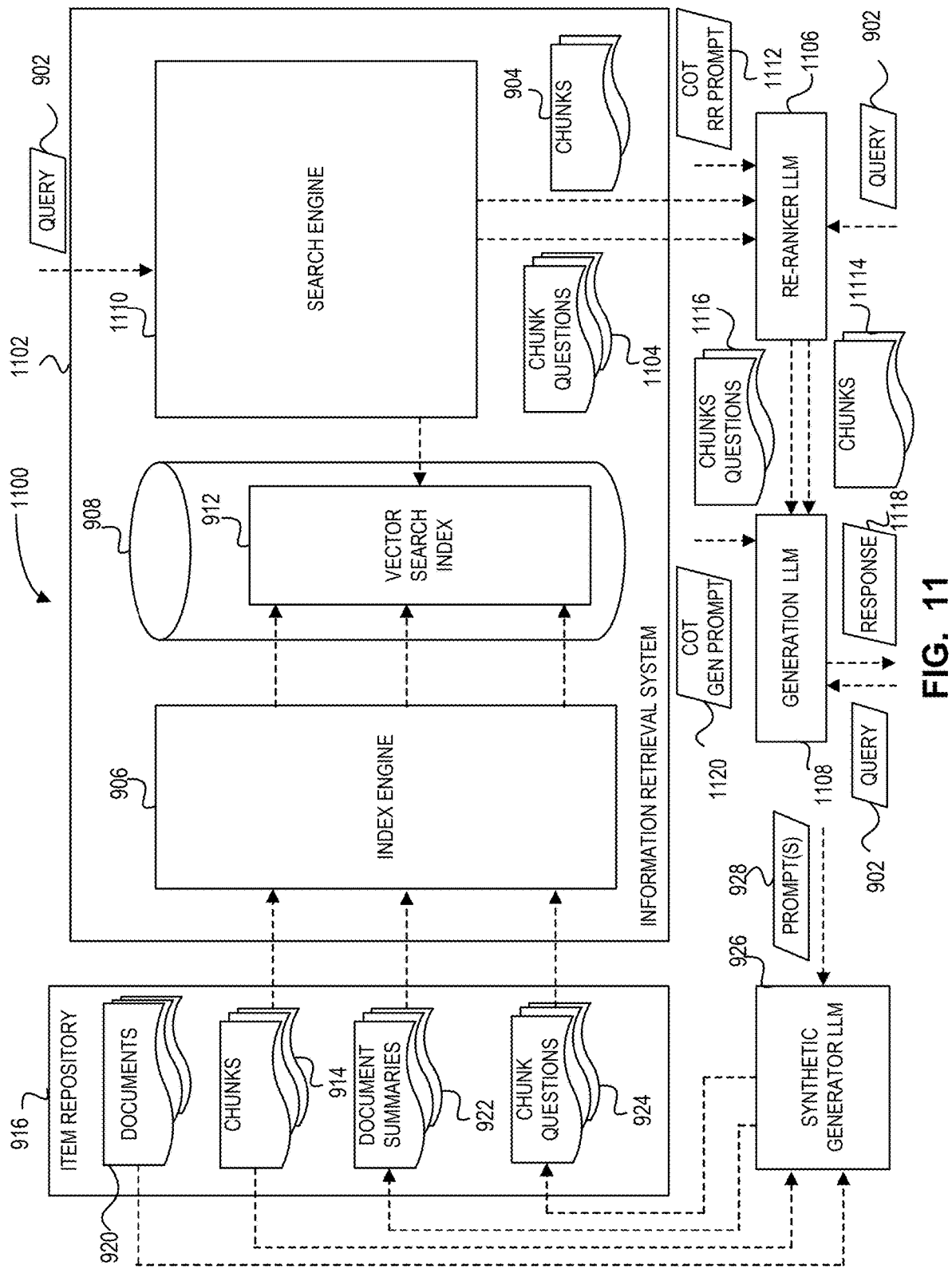
FIG. 11 is a block diagram of an example RAG system.

Reference is now made to FIG. 11 which illustrates an example RAG system 1100 which can be used in the pipeline 208 of FIG. 2 (e.g., it can be used to perform the functions of the information retrieval system 220, re-ranker LLM 216 and generation LLM 218 of the pipeline 208 of FIG. 2). However, the RAG system 1100 of FIG. 11 can also be used independently from the pipeline 208 of FIG. 2 as a stand-alone RAG system. The RAG system 1100 of FIG. 11 can be described as a combination of the information retrieval system 900 of FIG. 9 and the generation system 1000 of FIG. 10.

The RAG system 1100 of FIG. 11 comprises an information retrieval system 1102 that is almost identical to the information retrieval system 900 of FIG. 9. Specifically, the information retrieval system 1102 is configured to perform multi-vector search on a vector search index 912 that comprises a plurality of vectors for each item (e.g., chunk) 914 to be searched. One vector for each item (e.g., chunk) 914 is generated from (and represents) the item (e.g., chunk) 914 itself and at least one other vector for each item (e.g., chunk) 914 is generated from (and represents) a piece of synthetic information (e.g., summary, keyword, content) 922, 924 generated for that item (e.g., chunk) 904 by a synthetic generation LLM 926. Accordingly, all of the comments provided above with respect to the information retrieval system 900 of FIG. 9 equally apply to the information retrieval system 1102 of FIG. 11.

The only difference between the information retrieval system 1102 of FIG. 11 and the information retrieval system 900 of FIG. 9 is that, in addition to retrieving and outputting a set of items (e.g., chunks 904) that are relevant to the query 902, the search engine 1110 of FIG. 11 also retrieves and outputs, for each item (e.g. chunk) in the set of items (e.g., chunks) 904, at least one piece of synthetic information 1104 associated with that item. In the example shown in FIG. 11 the search engine 1110 outputs, for each item (e.g., chunk) in the set of items (e.g., chunks) 904, the synthetic question (s) 1104 associated with that item (e.g., chunk), but it will be evident that this is just an example of a piece of synthetic information associated with an item (e.g., chunk) that may be output. The search engine 1110 of FIG. 11 otherwise operates in the same manner as the search engine 910 of FIG. 9.

The RAG system 1100 of FIG. 11 also comprises a re-ranker LLM 1106 and a generation LLM 1108 which are used in a similar manner as the re-ranker LLM 1008 and the generation LLM 1010 of FIG. 10 respectively. Specifically, the re-ranker LLM 1106 is used to rank the set of items (e.g., chunks) 904 retrieved by the information retrieval system 1102 based on their relevance to the query 902 via chain-of-thought prompting. This is implemented by providing the set of items (e.g., chunks) 904 retrieved by the information retrieval system 1102, the corresponding synthetic information 1104, and the query 902 to the re-ranker LLM 1106 along with a chain-of-thoughts (CoT) re-ranker (RR) prompt 1112 that instructs the re-ranker LLM 1106 to explain why each chunk is relevant to the query and assign a relevance rating thereto, and then rank the set of items (e.g., chunks) 904 based on their relevance to the query 902. However, in contrast to the CoT re-ranker prompt 1014 of FIG. 10 which instructs the re-ranker LLM 1008 to generate the explanation from the item (e.g., chunk) itself, the CoT re-ranker prompt 1112 of FIG. 11, instructs the re-ranker LLM 1106 to generate the explanation for an item (e.g., chunk) from the item (e.g., chunk) 904 and the related synthetic information 1104.

Once the re-ranker LLM 1106 has generated a ranking of the set of items (e.g., chunks) 904, a subset of the items (e.g., chunks) 1114 are selected based on the ranking. In some cases, the CoT re-ranker prompt 1112 may cause the re-ranker LLM 1106 to, in addition to ranking the set of items (e.g., chunks) 904, select the subset of items (e.g., chunks) 1114 based on the ranking. However, in other examples, another module, such as a subset selection module (not shown) may be configured to receive the ranking of the set of items (e.g., chunks) 904 generated by the re-ranker LLM 1106 and select the subset of items (e.g., chunks) 1114 based on the ranking. The subset of items (e.g., chunks) 1114 may be selected from the ranking in any suitable manner, such as those described above with respect to FIGS. 2 and 8.

The re-ranker LLM 1106 may be implemented by any LLM that can perform re-ranking of a set of passages. In some cases, the re-ranker LLM 1106 may be implemented by a Microsoft Azure™ Open AI LLM (e.g., a GPT-4o, GPT-4 Turbo, GPT-4, or GPT-3.5 Turbo model).

Once the subset of items (e.g., chunks) 904 has been selected based on the ranking, the generation LLM 1108 is used to generate a response 1118 to the query 902 based on the subset of items (e.g., chunks) 1114 and synthetic information 1116 related to the subset of items (e.g., chunks). In some cases, this may comprise providing the generation LLM 1108 the subset of items (e.g., chunks) 1114, the synthetic information 1116 related to the subset of items (e.g., chunks), the query 902 and a generation prompt as described above with respect to FIG. 2. However, in other cases, this may comprise providing the generation LLM 1108 with the subset of items (e.g., chunks) 1114, the synthetic information 1116 related to the subset of items, and the query 902 along with a CoT generation (GEN) prompt 1120. The CoT generation prompt 1120 is configured to cause the generation LLM 1108 to generate the response 1118 to the query 902 based on the subset of items (e.g., chunks) 1114 and the synthetic information 1116 through a step-by-step process. Specifically, the CoT generation prompt 1120 instructs the generation LLM 1108 to explain, using the item (e.g. chunk) and its related synthetic information, why each item (e.g., chunk) in the subset of items (e.g., chunks) 904 is relevant to the query 902 and assign a relevance rating thereto, and then generate a response 1118 to the query 902 based on the set of items (e.g. chunks). Such a CoT generation prompt 1120 forces the generation LLM 1108 to stay focused on the content of relevance when generating the response 904. It also forces the generation LLM 1108 to identify the relevant sections of the chunks before generating a response.

As noted above, LLMs are a class of machine learning models that have been trained on massive amounts of data so that they can understand and generate natural language. The generation LLM 1108 may be implemented by any LLM that can generate a response to a query using provided passages. In some cases, the generation LLM 1108 may be implemented by a Microsoft Azure™ Open AI LLM (e.g., a GPT-4o, GPT-4 Turbo, GPT-4, or GPT-3.5 Turbo model).

In other examples, a CoT re-ranker prompt may not be provided to the re-ranker LLM 1106 to cause the re-ranker LLM 1106 to rank the set of items (e.g., chunks) 904. In contrast, a standard re-ranker prompt or set of prompts, as described above with respect to FIG. 2, may be provided to the re-ranker LLM 1106 to rank the set of chunks.

Although in FIG. 11 the query provided to the information retrieval system 900 is the same as the query used for information generation, in other cases they may be different queries. For example, if the RAG system 1100 of FIG. 11 is used in the pipeline 208 of FIG. 8, the query provided to the information retrieval system may be the amended query and the query used for response generation may be the original user query.

Figure 12:
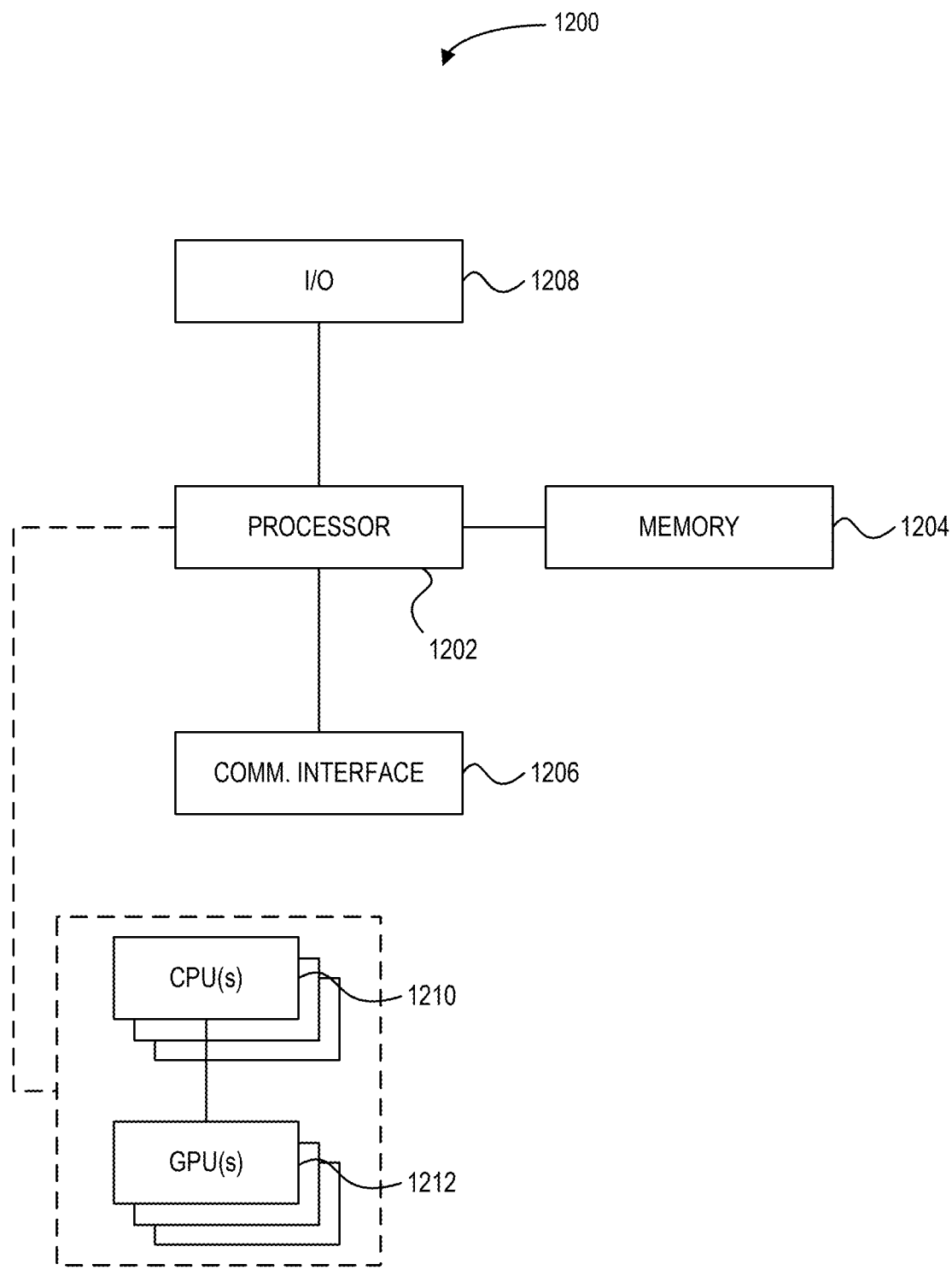
FIG. 12 is a block diagram of an example computer.

Reference is now made to FIG. 12 which illustrates a simplified block diagram of an example computer 1200. Computer 1200 is an example implementation of a computer which may implement the source database system 110, EDPP 120, one or more components of the cloud-based computing cluster 130 of FIGS. 1 and 2, and/or one or more component of the information retrieval systems 600, 700, 900 of FIGS. 6, 7 and 9. Computer 1200 has at least one processor 1202 operatively coupled to at least one memory 1204, at least one communications interface 1206 (also referred to herein as a network interface), and at least one input/output (I/O) device 1208.

The at least one memory 1204 includes a volatile memory that stores instructions executed or executable by the processor 1202, and input and output data used or generated during execution of the instructions. The memory 1204 may also include non-volatile memory used to store input and/or output data—e.g., within a database—along with program code containing executable instructions.

The processor 1202 may transmit or receive data via the communications interface 1206 and may also transmit or receive data via any additional input/output device 1208 as appropriate.

In some cases, the processor 1202 includes a system of central processing units (CPUs) 1210. In other cases, the processor 1202 includes a system of one or more CPUs 310 and one or more Graphical Processing Units (GPUs) 1212 that are coupled together. For example, any of the LLMs 214, 216, 218, 926 described herein may execute neural network computations on CPU and GPU hardware, such as the system of CPUs 1210 and GPUs 1212 of FIG. 12.

Figure 13:
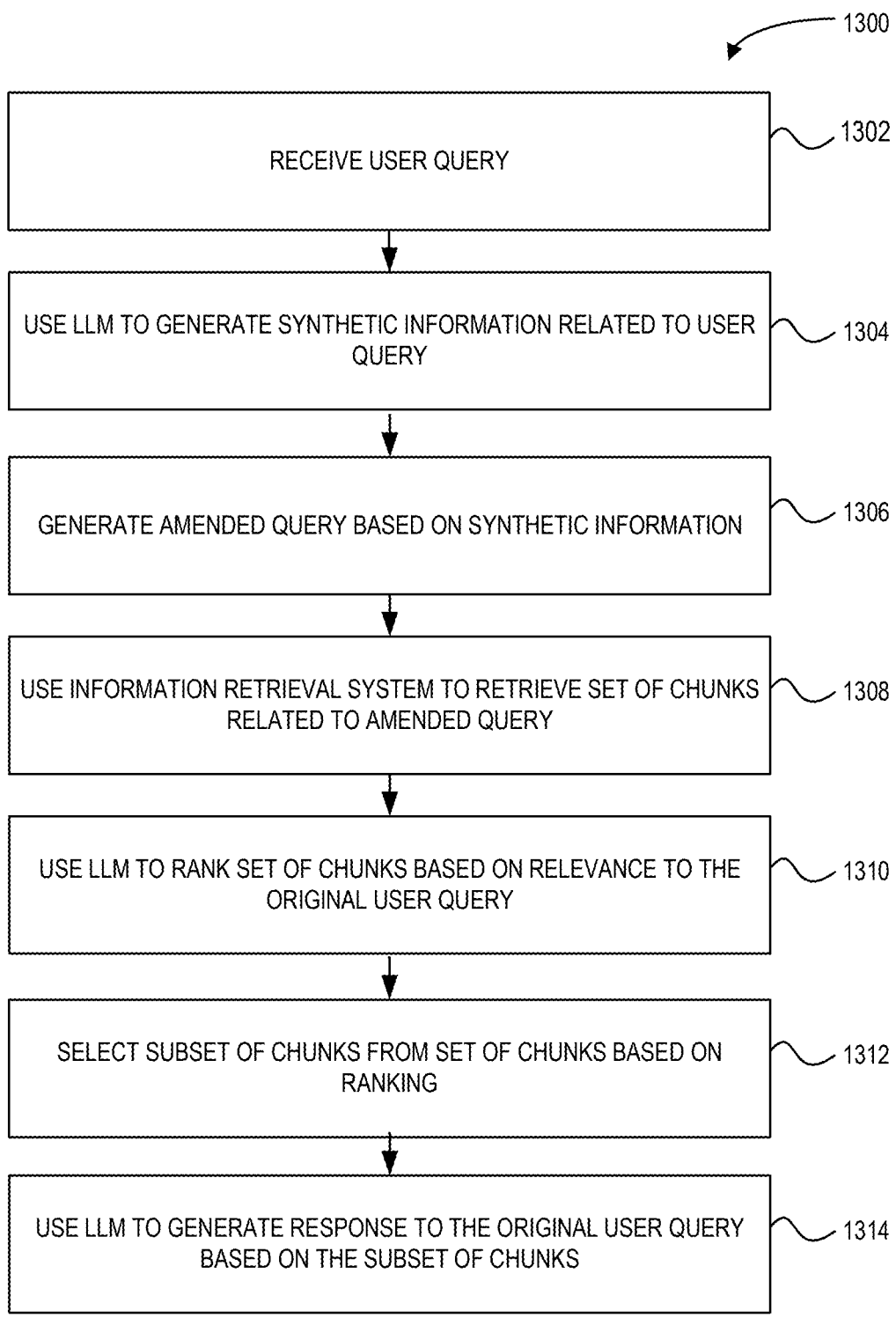
FIG. 13 is a flow diagram of a first example method of generating a response to a query from a corpus of documents.

Reference is now made to FIG. 13 which illustrates an example method 1300 for generating a response to a user query which may be executed, for example, by the pipeline 208 of FIG. 2. The method 1300 may implemented by one or more processors of one or more computers. The method 1300 begins at block 1302 where a user query is received. The method 1300 then proceeds to block 1304.

At block 1304, a first LLM (e.g., query modification LLM 214) is used to generate synthetic information related to the user query. As described above, using an LLM to generate synthetic information related to a user query may comprise providing the user query and a query modification prompt to the LLM which instructs the LLM to generate the synthetic information related to the user query. Examples of synthetic information which the query modification prompt may instruct the LLM to generate was provided above. For example, the query modification may include; instructions to generate a set of keywords for the query, wherein the query is the synthetic information; instructions to generate a passage that answers the user query wherein the passages is the synthetic information; instructions to provide a concise rationale to the user query and think step by step, wherein the synthetic information is the rationale; or instructions to generate an answer to the user prompt and give the rational, wherein the rationale is the synthetic information. In yet other cases, the LLM may be provided with additional information that aids in generating the synthetic information. For example, in some cases, the query may be first provided to an information retrieval system to retrieve the document in the corpus of documents that is most relevant to the query. Then the query, the retrieved document and a prompt may be provided to the query modification LLM, wherein the prompt comprises instructions to generate the synthetic information (e.g., keywords, passage, rationale) given the context of the returned document. Once the synthetic information for the query has been generated the method 1300 proceeds to block 1306.

At block 1306, a modified query is generated from the synthetic information. In some cases, the modified query is generated by combining the original user query and the synthetic information generated in block 1304. For example, in some cases, the generated synthetic information may be concatenated to the original user query. In other cases, the modified query is generated by replacing the original user query with the synthetic information—i.e., the modified query only comprises the synthetic information. Once the modified query has been generated the method 1300 proceeds to block 1308.

At block 1308, an information retrieval system is used to retrieve a set of chunks, from a plurality of chunks generated from a corpus of documents, that are relevant to the modified query. In other words, each chunk of the plurality of chunks is all or a portion of a document in the corpus of documents. Example methods for retrieving a set of chunks, from a plurality of chunks generated form a corpus of documents, that are relevant to a query were describe above and are described below with respect to FIGS. 14 and 15. Once a set of chunks relevant to the modified query have been retrieved, the method 1300 proceeds to block 1310.

At block 1310, an LLM (e.g., re-ranker LLM 116) is used to rank the set of chunks retrieved in block 1308. Using an LLM to rank the set of chunks may comprise providing the LLM with the set of chunks and one or more prompts which cause the LLM to rank the. Example prompts and sets of prompts which can be used to cause an LLM to rank a set of chunks were provided above. Once the set of chunks have been ranked by the LLM, the method 1300 proceeds to block 1312.

At block 1312, a subset of chunks of the set of chunks is selected based on the ranking of the set of chunks generated in block 1310. The term "subset of X" is used herein to mean less than X—i.e., if X has a set of elements, then a subset of X does not have all of the element of X. As described above, in some cases, the top k chunks based on the ranking are selected to form the subset, wherein k is an integer greater than 1. In other cases, the ranking may be used to identify the top documents (e.g., the top documents may the documents associated with the top three ranked chunks) and then all or a subset of the chunks in the set of chunks associated with the top documents may be selected. Once a subset of chunks from the set of chunks retrieved in block 1308 have been selected, the method 1300 proceeds to block 1314.

At block 1314, an LLM (e.g., generation LLM 218) is used to generate a response to the original user query (the user query received at block 1302) based on the subset of chunks selected in block 1312. Using an LLM to generate a response to the original user query based on the subset of chunks may comprise providing the LLM with the subset of chunks along with a prompt that instructs the LLM to generate a response based on the subset of chunks. As described above, the prompt may instruct the LLM to cite any referenced chunks and/or their corresponding document in the response. Once the response has been generated, the method 1300 may end.

Figure 14:
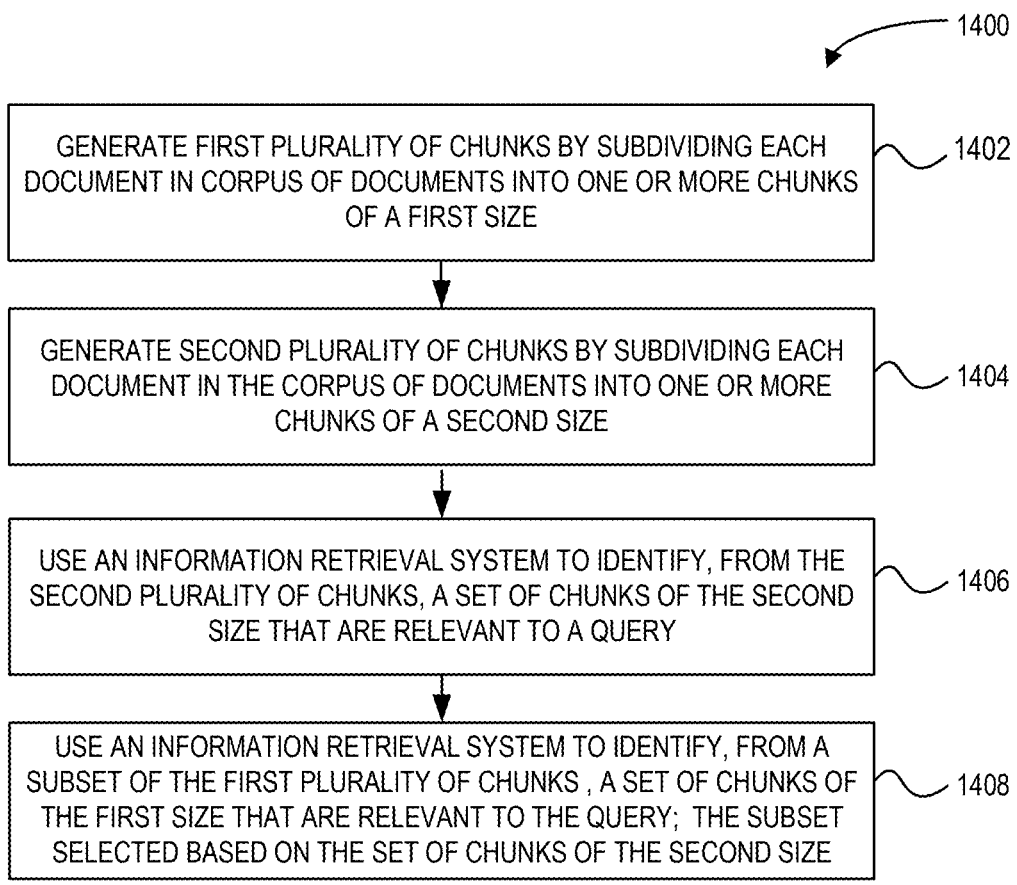
FIG. 14 is a flow diagram of a first example method of retrieving information relevant to a query from a corpus of documents.

Reference is now made to FIG. 14 which illustrates an example method 1400 for retrieving information in a corpus of documents that is relevant to a query which may be executed, for example, by the information retrieval system 700 of FIG. 7. The method 1400 may implemented by one or more processors of a computer or a computing system. The method 1400 begins at block 1402 where a first plurality of chunks is generated by sub-dividing each document in the corpus of documents into one or more chunks of a first size to form a first plurality of chunks. Subdividing a document into chunks of the first size does not mean that each chunk has exactly the same size, only that each chunk does not exceed the first size. The documents may be subdivided into chunks of the first size using any suitable method, such as, but not limited to, those described above with respect to the chunking module 222. Once the first plurality of chunks has been generated the method 1400 proceeds to block 1404.

At block 1404, a second plurality of chunks is generated by subdividing each document in the corpus of documents into one or more chunks of a second, larger, size. Subdividing a document into chunks of the second size does not mean that each chunk has exactly the same size, only that each chunk does not exceed the second size. The documents may be subdivided into chunks of the second size using any suitable method, such as, but not limited to, those described above with respect to the chunking module 222. Once the second plurality of chunks has been generated, the method 1400 proceeds to block 1406.

At block 1406, an information retrieval system is used to identify, from the second plurality of chunks, a set of chunks of the second size that are relevant to the query. Using an information retrieval system to identify a set of chunks of the second size that are relevant to the query may comprise using an index engine of the information retrieval system to generate a search index for the second plurality of chunks and using a search index of the information retrieval system to search the search index for the second plurality of chunks to identify a set of chunks of the second size that are similar to the query. The search index represents the information in the set of chunks in a form that can be easily searched. As described above, there are many ways to generate a search index for a plurality of chunks, such as, but not limited to tokenization, vectorization and a combination of tokenization. Where vectorization is used to generate a search index for the second plurality of chunks, each chunk of the second plurality of chunks is embedded, using an embedding model, into a plurality of embeddings (i.e., a multi-dimensional vector) and each multi-dimensional vector is stored in the search index in a searchable field.

As described above, there are many ways to search a search index for items that are relevant to a query. The method used to search a search index is generally based on the technique or techniques used to generate the search index. For example, as described above, where the search index was generated using vectorization then searching the search index to identify chunks of the second size that are similar to the query may comprise converting (or embedding), using the same embedding model used to generate the vectors in the search index, the query into a plurality of embeddings (i.e., multi-dimensional vector) and identifying (using, for example KNN or HNSW) chunks of the second size that have a multi-dimensional vector that is close to the multi-dimensional vector for the query based on one or more distance metrics (e.g. cosine angle etc.).

At block 1408, the information retrieval system is used to identify, from a subset of the first plurality of chunks, a set of chunks of the first size that are relevant to the query. The subset of the first plurality of chunks is selected based on the set of chunks of the second size identified in block 1406.

In some cases, the subset of the first plurality of chunks are the chunks in the first plurality of chunks that are associated with a relevant document, wherein a relevant document is a document that is associated with at least one chunk in the set of chunks of the second size identified in block 1406. In these cases, the subset may be selected by identifying the document associated with each chunk of the set if chunks of the second size identified in block 1406 and selecting the unique documents of the identified documents of the relevant document, and then selecting the subset to be the chunks in the first plurality of chunks associated with a relevant document. For example, as shown in FIG. 8, if all the chunks in the set of chunks of the second size identified in block 1406 corresponding to one of document 1, 2 and 5, then the relevant documents are documents 1, 2, and 5 and the subset of chunks in the first plurality of chunks may comprise only those chunks in the first plurality of chunks that correspond to or are associated with documents 1, 2 and 5.

Using an information retrieval system to identify, from a subset of chunks in a first plurality of documents, a set of chunks of the first size that are relevant to the query may comprise using an index engine of the information retrieval system to generate a search index for the first plurality of chunks and using a search engine of the information retrieval system to perform a filtered search (filtered so as to be limited to the subset) on the search index for the first plurality of chunks to identify a set of chunks of the first size that are similar to the query. The search index represents the information in the first plurality of chunks in a form that can be easily searched. It is noted that the search index for the first plurality of chunks is separate and distinct from the search index for the second plurality of chunks. As described above, there are many ways to generate a search index for a plurality of chunks, such as, but not limited to tokenization, vectorization and a combination of tokenization and vectorization. Where vectorization is used to generate a search index for the first plurality of chunks, each chunk of the first plurality of chunks is embedded, using an embedding model, into a plurality of embeddings (i.e., a multi-dimensional vector) and each multi-dimensional vector is stored in the search index in a searchable field.

As described above, there are many ways to search a search index for items that are relevant to a query. The method used by the search engine to search a search index is generally based on the technique or techniques used to generate the search index. For example, as described above, where the search index was generated using vectorization then searching the search index to identify chunks of the second size that are similar to the query may comprise converting (or embedding), using the same embedding model used to generate the vectors in the search index, the query into a plurality of embeddings (i.e., multi-dimensional vector) and identifying (using, for example KNN or HNSW) chunks of the first size, in the subset, that have a multi-dimensional vector that is close to the multi-dimensional vector for the query based on one or more distance metrics (e.g. cosine angle etc.).

Once a set of chunks of the first size that are relevant to the query have been identified the method 1400 may end or the set of chunks of the first size may be retrieved from a data store or repository.

Figure 15:
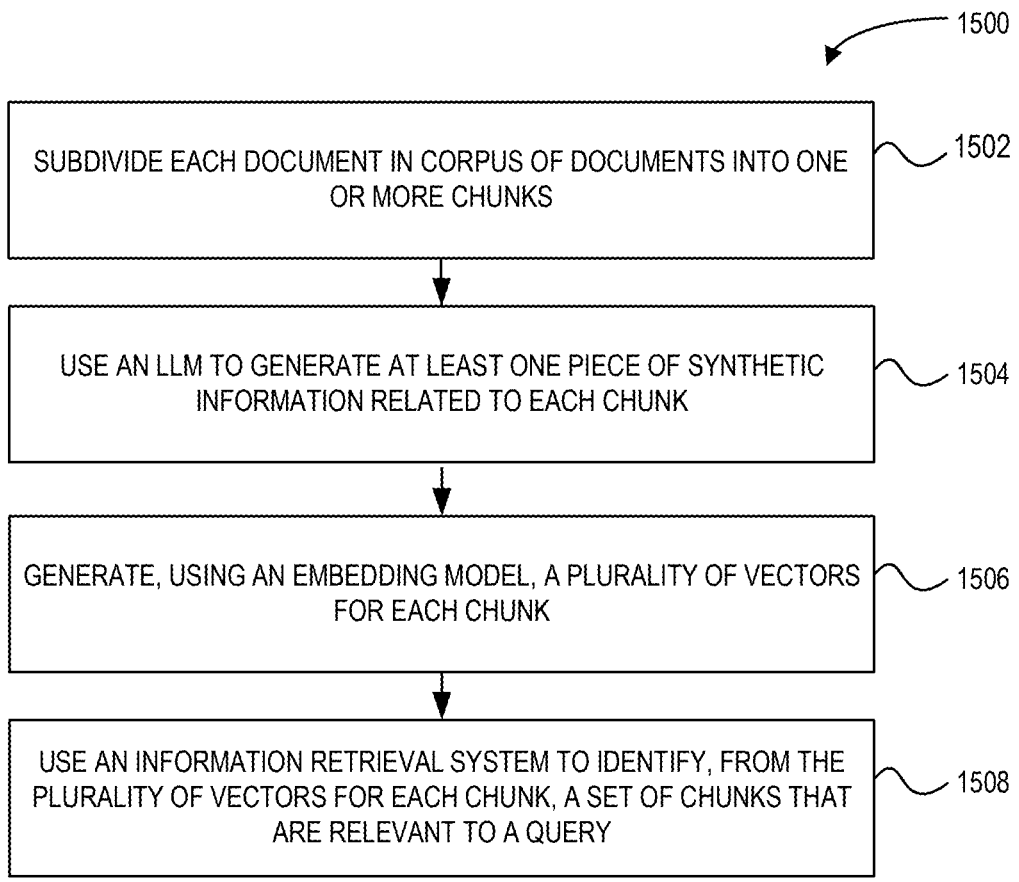
FIG. 15 is a flow diagram of a second example method of retrieving information relevant to a query from a corpus of documents.

Reference is now made to FIG. 15 which illustrates an example method 1500 for retrieving information in a corpus of documents that is relevant to a query which may be executed, for example, by the information retrieval system 900 of FIG. 9. The method 1500 may be implemented by one or more processors of a computer. The method 1500 begins at block 1502 where each document in the corpus of documents is subdivided into one or more chunks. The documents may be subdivided into chunks of using any suitable method, such as, but not limited to, those described above with respect to the chunking module 222. Once the documents have been subdivided into a plurality of chunks the method 1500 proceeds to block 1504.

At block 1504, an LLM (e.g., synthetic generation LLM 926) is used to generate at least one piece of synthetic information for each chunk generated in block 1502. In some cases, using an LLM to generate at least one piece of synthetic information for each chunk may comprise, for each chunk, providing that chunk to the LLM along with a synthetic generation prompt that instructs the synthetic generation LLM 926 to generate one or more pieces of synthetic information 922, 924 related to the item (e.g., chunk). The synthetic data that the synthetic generation LLM 926 is instructed to generate by the synthetic generation prompt 928 may comprise one or more of: a summary of the item chunk, keywords for the chunk, the content of the chunk, and one or more questions that can be answered by the chunk. In some cases, using an LLM to generate at least one piece of synthetic information for each chunk may also or alternatively comprise, for each document of the corpus of documents, providing the document to the LLM to generate synthetic information (e.g., a summary) for the document, and the synthetic information generated for the document may be used as one piece of synthetic information for each chunk associated with (i.e., generated from) that document.

At block 1506, an embedding model is used to generate a plurality of vectors for each chunk generated in block 1502. The plurality of vectors for a chunk comprises a vector generated from the chunk and a vector generated from each of the at least one piece of synthetic information related to that chunk (i.e., a different vector is generated for each piece of synthetic information generated for that chunk). In some cases, as shown in FIG. 9, the generated vectors may be stored in a search index of an information retrieval system in separate search fields. Once a plurality of vectors has been generated for each chunk, the method 1500 proceeds to block 1508.

At block 1508, an information retrieval system is used to identify, from the plurality of vectors for each chunk, a set of chunks, of the chunks generated in block 1502, that are relevant to a query. The information retrieval system may identify the set of chunks that are relevant to the query by using the embedding model used in block 1506, to generate a vector for the amended user query and comparing the vector for the query to the plurality of vectors for each chunk of the plurality of chunks.

As described above, in some cases, the information retrieval system may be configured to group all of the vectors that were generated in the same manner together (e.g., grouping all the vectors generated from a chunk itself together, grouping all the vectors generated from a summary of the chunk together etc.); performing a separate vector search on the vectors in each group to identify the k chunks with multi-dimensional vectors that are closest to the query multi-dimensional vector; and then combining the results of the different vector searches to generate a final set of k chunks that are most similar to the query. The set of k chunks with multi-dimensional vectors in a particular group that are closest to the query multi-dimensional vector may be identified using any suitable algorithm such as, but not limited to, KNN and HNSW. The distance between multi-dimensional vectors may be measured using any suitable metric such as, but not limited to, cosine angle, Euclidean distance and DotProduct.

Once a search has been performed on each vector group, such that there is a ranked list of k chunks for each vector group, the results of the vector searches are combined to get a final list of k chunks that are most relevant to the query. In one example, the results may be combined using a re-ranker technique or algorithm, such as, but not limited to, Reciprocal Rank Fusion (RRF) with or without weighted scoring. In RRF each chunk, in a ranked list of k chunks, is assigned a reciprocal rank score based on its position in the list. The score is calculated as 1/(rank+m), where rank is the position of the items in the list and m is a constant that may be empirically selected. Then for each chunk, its reciprocal rank scores are combined to get a final combined score. The chunks are then ranked based on their combined scores. For example, in some cases the combined score for chunk may be the sum of its reciprocal scores. In other cases, the reciprocal score for vectors in different groups may be weighted differently. For example, the ranking for the vector generated from the chunk itself may be given more weight than the ranking for the vector generated from a summary of the chunk. In these cases, the combined score for a chunk may be a weighted sum of its reciprocal scores.

Once a set of chunks that are relevant to the query have been identified the method 1500 may end or the set of chunks may be retrieved from a data store or repository.

Figure 16:
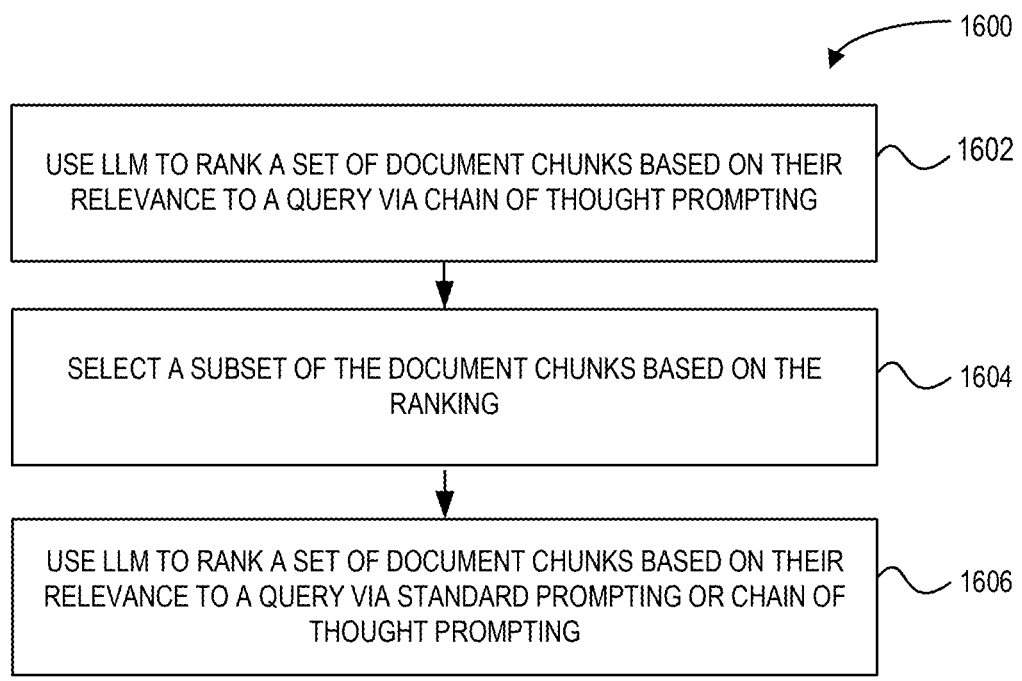
FIG. 16 is a flow diagram of an example method of generating a response to a query from a set of relevant document chunks using one or more LLMs.

Reference is now made to FIG. 16 which illustrates an example method 1600 for generating a response to a query based on a set of document chunks which may be executed, for example, by the system 1000 of FIG. 10. The method 1600 may be implemented by one or more processors of a computer. The method 1600 begins at block 1602 where chain of thought prompting is used to cause an LLM (e.g., a re-ranker LLM 1008) to rank a set of document chunks based on their relevance to a query. The document chunks that are ranked may be document chunks that have been retrieved by an information retrieval system on the basis that they are related to the query. This may comprise providing the LLM with the set of document chunks, and the query along with a CoT re-ranker prompt that instructs the LLM to, for each chunk in the set of chunks 904, explain (using the chunk) why that chunk is relevant to the query and assign a relevance rating thereto, and then rank the set of chunks based on their relevance to the query. Once the LLM has ranked the set of document chunks, the method 1600 proceeds to block 1604.

At block 1604, a subset of the document chunks is selected based on the ranking generated in block 1602. Any method for selecting a subset of the document chunks, such as those described above with respect to FIGS. 2 and 8, may be used. Once a subset of the document chunks is selected, the method 1600 proceeds to block 1606.

At block 1606, an LLM is used to generate a response to the query based on the subset of the document. This may comprise providing the LLM with a generation prompt such as that described above with respect to FIG. 2 or providing the LLM with a CoT generation prompt such as that described above with respect to FIG. 10. Once the LLM has generated the response the method 1600 may end.

Figure 17:
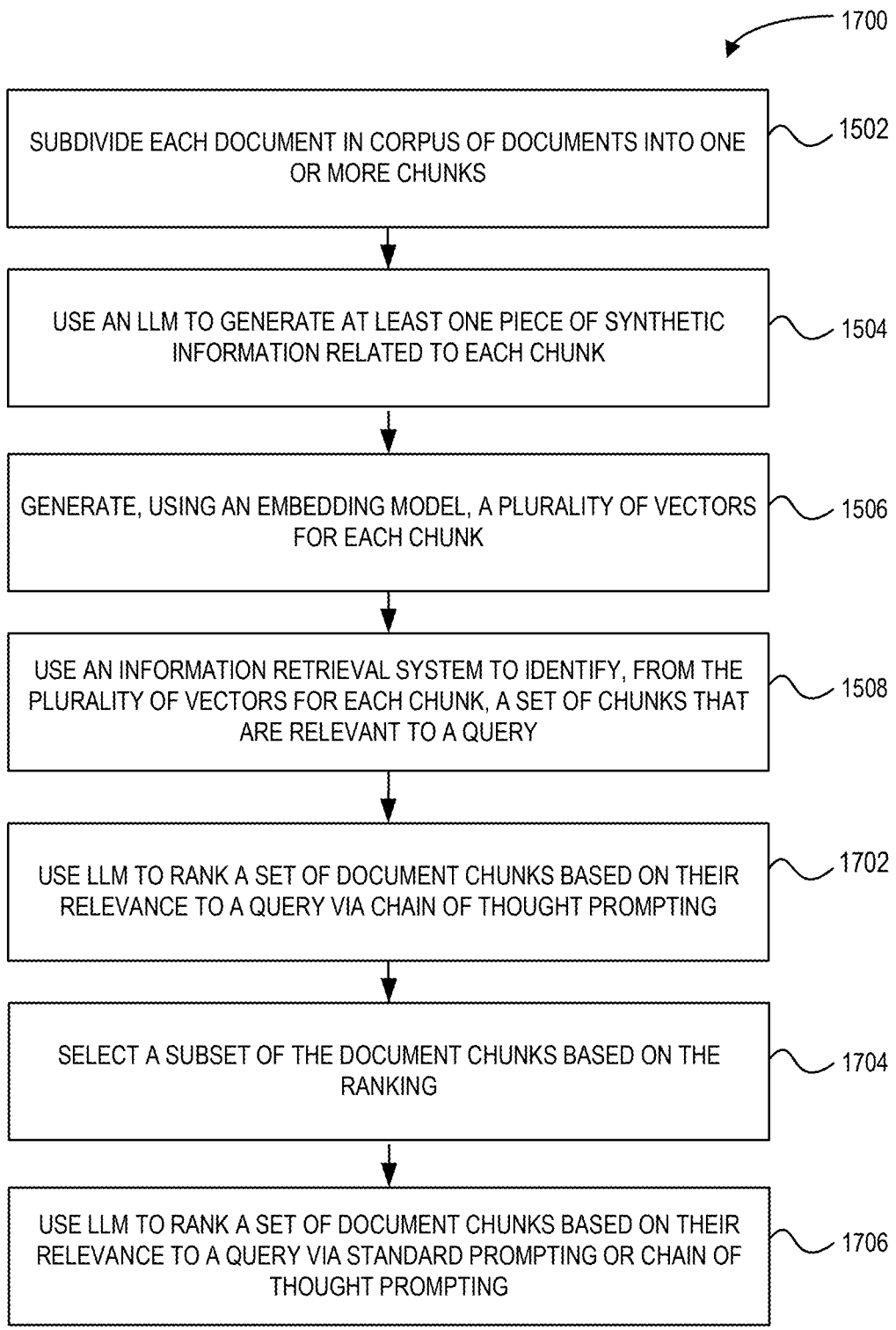
FIG. 17 is a flow diagram of a second example method of generating a response to a query from a corpus of documents.

Reference is now made to FIG. 17 which illustrates an example method 1700 of generating a response to a query based on a corpus of documents, which may be implemented by the system 1100 of FIG. 11. The method 1700 may be implemented using one or more processors of one or more computers. The method 1700 begins with blocks 1502 to 1508 of the method 1500 of FIG. 15 to retrieve a set of document chunks that are relevant to the query. The method 1700 then proceeds to block 1702.

At block 1702 chain of thought prompting is used to cause an LLM (e.g., a re-ranker LLM 1106) to rank a set of document chunks based on their relevance to a query. This may comprise providing the LLM with the set of document chunks, and the query along with a CoT re-ranker prompt that instructs the LLM to, for each chunk in the set of chunks, explain (using the chunk and the related synthetic information generated in block 1504) why that chunk is relevant to the query and assign a relevance rating thereto, and then rank the set of chunks based on their relevance to the query. Once the LLM has ranked the set of document chunks, the method 1700 proceeds to block 1704.

At block 1704, a subset of the document chunks is selected based on the ranking generated in block 1702. Any method for selecting a subset of the document chunks, such as those described above with respect to FIGS. 2 and 8, may be used. Once a subset of the document chunks is selected, the method 1700 proceeds to block 1706.

At block 1706, an LLM is used to generate a response to the query based on the subset of document chunks and their corresponding synthetic information generated in block 1504. This may comprise providing the LLM with a generation prompt such as that described above with respect to FIG. 2 or providing the LLM with a CoT generation prompt such as that described above with respect to FIG. 11. Once the LLM has generated the response the method 1700 may end.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112a, or 112b). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for retrieving information from a corpus of documents relevant to a query, the system comprising:
    a memory, a communication interface, and at least one processor operatively coupled to
    the memory and the communication interface;
    the at least one processor configured to:
        subdivide each document in the corpus of documents into one or more chunks;
        execute a synthetic generation LLM to generate at least one piece of synthetic information related to each chunk;
        generate, using an embedding model, a plurality of vectors for each chunk, the plurality of vectors for a chunk comprising a vector generated from the chunk, and a vector generated from each of the at least one piece of synthetic information related to that chunk; and
        use an information retrieval system to identify, from the plurality of vectors for each chunk, a set of chunks that are relevant to a query;
    wherein the information retrieval system is configured to identify, from the plurality of vectors for each chunk, the set of chunks that are relevant to the query by:
        generating, using the embedding model, a vector for the query;
        performing a first vector search on the vectors generated from each chunk to identify a first set of k ranked chunks with vectors that are closest to the vector for the query; and
        performing a second vector search on the vectors generated from a same type of synthetic information for each chunk to identify a second set of k ranked chunks with vectors that are closest to the vector for the query; and
        identifying a set of k chunks that are most similar to the query from the first set of k ranked chunks and the second set of k ranked chunks.

2. The system of claim 1, wherein the at least one processor is configured to execute the synthetic generation LLM to generate the at least one piece of synthetic information for each chunk by, for each chunk, providing the chunk to the synthetic generation LLM along with a prompt that instructs the synthetic generation LLM to generate the at least one piece of synthetic information for the chunk.

3. The system of claim 2, wherein the at least one piece of synthetic information for the chunk comprises one or more of a summary of the chunk, one or more keywords for the chunk, a content of the chunk, and one or more questions that can be answered by a content of the chunk.

4. The system of claim 1, wherein the at least one processor is configured to execute the synthetic generator to generate the at least one piece of synthetic information for each chunk, by, for each document of the corpus of documents, providing the document to the synthetic generation LLM along with a prompt that instructs the synthetic generation LLM to generate synthetic information for the chunk, and wherein the synthetic information for the document is used as a piece of synthetic information for each chunk generated from that document.

5. The system of claim 4, wherein the synthetic information for the document is a summary of the document.

6. The system of claim 1, wherein the plurality of vectors for each chunk are stored in a search index of the information retrieval system.

7. The system of claim 1, wherein the information retrieval system is configured to identify, from the plurality of vectors for each chunk, the set of chunks that are relevant to the query by generating, using the embedding model, a vector for the query; comparing the vector for the query to the plurality of vectors for each chunk; and identifying the set of chunks that are relevant to the query based on the comparisons.

8. The system of claim 1, wherein the set of k chunks that are most similar to the query are identified from the first set of k ranked chunks and the second set of k ranked chunks using a reciprocal rank fusion algorithm.

9. The system of claim 1, wherein the at least one processor is further configured to retrieve the set of chunks that are relevant to the query from storage.

10. The system of claim 1, wherein the at least one processor is further configured to use a re-ranker LLM to rank the set of chunks relevant to the query based on a relevance to the query or another query related to the query.

11. The system of claim 10, wherein the at least one processor is further configured to select a subset of chunks from the set of chunks relevant to the query or the other query based on the ranking.

12. The system of claim 11, wherein selecting the subset of chunks from the set of chunks relevant to the query based on the ranking comprises selecting k chunks of the set of chunks relevant to the query with a highest ranking to form the subset, wherein k is an integer greater than or equal to 1.

13. The system of claim 11, wherein selecting the subset of chunks from the set of chunks based on the ranking comprises selecting a set of top documents of the corpus of documents from the ranking and selecting all or a portion of the chunks in the set of chunks relevant to the query that are associated with the set of top documents to form the subset.

14. The system of claim 11, wherein the at least one processor is further configured to use a generation LLM to generate a response to the query or the other query based on the subset of chunks.

15. The system of claim 14, wherein the response to the query or the other query comprises one or more citations to a document of the corpus of documents corresponding to a chunk of the subset of chunks.

16. The system of claim 1, wherein the at least one processor is further configured to:

use a query modification LLM to generate synthetic information related to a second query; and
generate an amended second query based on the synthetic information related to the second query; and
wherein the query is the amended second query.

17. The system of claim 16, wherein the at least one processor is configured to:

use the query modification LLM to generate synthetic information related to the second query by instructing the query modification LLM to generate a set of one or more keywords for the second query; and
generate the amended second query based on the synthetic information related to the second query by combining the second query and the set of one or more keywords to form the amended second query.

18. A method for retrieving information from a corpus of documents relevant to a query, the method executed in a computing environment comprising one or more processors, a communication interface, and memory, and the method comprising:

subdividing each document in the corpus of documents into one or more chunks;
executing a synthetic generation LLM to generate at least one piece of synthetic information related to each chunk;
generating, using an embedding model a plurality of vectors for each chunk, the plurality of vectors for a chunk comprising a vector generated from the chunk, and a vector generated from each of the at least one piece of synthetic information related to that chunk; and
using an information retrieval system to identify, from the plurality of vectors for each chunk, a set of chunks that are relevant to a query;
wherein the information retrieval system is configured to identify, from the plurality of vectors for each chunk, the set of chunks that are relevant to the query by:
generating, using the embedding model, a vector for the query;
performing a first vector search on the vectors generated from each chunk to identify a first set of k ranked chunks with vectors that are closest to the vector for the query; and
performing a second vector search on the vectors generated from a same type of synthetic information for each chunk to identify a second set of k ranked chunks with vectors that are closest to the vector for the query; and
identifying a set of k chunks that are most similar to the query from the first set of k ranked chunks and the second set of k ranked chunks.

19. A non-transitory computer readable medium storing computer executable instructions which, when executed by at least one computer processor, cause the at least one computer processor to carry out a method for retrieving information from a corpus of documents relevant to a query, the method comprising:

subdividing each document in the corpus of documents into one or more chunks;
executing a synthetic generation LLM to generate at least one piece of synthetic information related to each chunk;
generating, using an embedding model a plurality of vectors for each chunk, the plurality of vectors for a chunk comprising a vector generated from the chunk, and a vector generated from each of the at least one piece of synthetic information related to that chunk; and using an information retrieval system to identify, from the plurality of vectors for each chunk, a set of chunks that are relevant to a query;
wherein the information retrieval system is configured to identify, from the plurality of vectors for each chunk, the set of chunks that are relevant to the query by:
generating, using the embedding model, a vector for the query;
performing a first vector search on the vectors generated from each chunk to identify a first set of k ranked chunks with vectors that are closest to the vector for the query; and
performing a second vector search on the vectors generated from a same type of synthetic information for each chunk to identify a second set of k ranked chunks with vectors that are closest to the vector for the query; and
identifying a set of k chunks that are most similar to the query from the first set of k ranked chunks and the second set of k ranked chunks.

* * * * *